US005859963A

United States Patent [19]

O'Dowd et al.

[11] Patent Number: 5,859,963

[45] Date of Patent: Jan. 12, 1999

[54] METHOD AND APPARATUS FOR OPTIMIZING TIME AND TESTING OF HIGHER LEVEL LANGUAGE PROGRAM

[75] Inventors: Daniel D. O'Dowd; David N. Kleidermacher, both of Santa Barbara, Calif.

[73] Assignee: Green Hills Software, Inc., Santa Barbara, Calif.

[21] Appl. No.: 544,917

[22] Filed: Oct. 18, 1995

Related U.S. Application Data

[63] Continuation of Ser. No. 212,600, Mar. 14, 1994, abandoned.

[51] Int. Cl.$^6$ .................................................. G06F 11/00
[52] U.S. Cl. ...................................... 395/183.14; 364/569
[58] Field of Search ....................... 395/183.01, 183.13, 395/183.14; 364/569, 550, 556, 551.01

[56] References Cited

U.S. PATENT DOCUMENTS

| | | | |
|---|---|---|---|
| 4,034,353 | 7/1977 | Denny et al. | 364/200 |
| 4,145,735 | 3/1979 | Soga | 364/200 |
| 4,231,106 | 10/1980 | Heap et al. | 364/900 |
| 4,302,820 | 11/1981 | Struger et al. | 364/900 |
| 4,309,756 | 1/1982 | Beckler | 364/300 |
| 4,432,051 | 2/1984 | Bogaert et al. | 364/200 |
| 4,435,753 | 3/1984 | Rizzi | 364/200 |
| 4,495,562 | 1/1985 | Yamaji et al. | 364/200 |
| 4,601,008 | 7/1986 | Kato | 364/900 |
| 4,636,948 | 1/1987 | Gdaniec et al. | 364/300 |
| 4,720,778 | 1/1988 | Hall et al. | 364/200 |
| 4,813,009 | 3/1989 | Tallman | 364/900 |
| 4,845,615 | 7/1989 | Blasciak | 364/265.6 |
| 4,872,167 | 10/1989 | Maezawa et al. | 371/29.1 |
| 4,894,829 | 1/1990 | Monie et al. | 371/20.1 |
| 5,021,948 | 6/1991 | Nakayama et al. | 364/264.3 |
| 5,045,994 | 9/1991 | Belfer et al. | 364/200 |
| 5,047,919 | 9/1991 | Sterling et al. | 364/264.4 |
| 5,103,394 | 4/1992 | Blasciak | 364/200 |
| 5,129,043 | 7/1992 | Yue | 395/51 |
| 5,204,960 | 4/1993 | Smith et al. | 395/700 |
| 5,245,638 | 9/1993 | Gustafson | 395/575 |
| 5,265,254 | 11/1993 | Blasciak et al. | 395/575 |
| 5,313,616 | 5/1994 | Cline et al. | 395/575 |
| 5,325,525 | 6/1994 | Shan et al. | 395/650 |
| 5,325,531 | 6/1994 | McKeeman et al. | 395/700 |
| 5,339,431 | 8/1994 | Rupp et al. | 395/700 |

*Primary Examiner*—Albert Decady
*Attorney, Agent, or Firm*—Thomas A. Turner, Jr.

[57] ABSTRACT

A method for time use analysis of a higher level language program is performed by displaying source code lines in descending order according to the amount of time spent by the program to execute machine code into which the source code lines have been compiled. Source code lines are displayed arranged in order according to the percentages of the amounts of time spent in execution during runs of the program, and the higher percentages identified for optimizing actions. A digital processing apparatus for performing the analysis includes a display for showing the source code lines that require the most time of execution, a selection apparatus for selecting those source code lines having the greater opportunity for significant corrective action, and displaying the various selected source code lines in the order in which the lines are kept in the program along with the corresponding time spent by the program to execute machine code into which the source code lines have been compiled. An improved method and apparatus identifies source code lines which a testing program does not test in its test procedure. A digital processing apparatus displays in different orders those source code lines identified as not having been used. Test programs are improved so that machine code instructions for all lines of source code are executed.

89 Claims, 8 Drawing Sheets

Fig. 3

Time Use Order
Exit

| Filename | Line | Seconds | Portion | Percent | Text |
|---|---|---|---|---|---|
| demo.c | 75 | 5.42 | 0.166621 | %16.621 | a[i%1000] = 1; |
| demo.c | 78 | 2.25 | 0.069000 | % 6.900 | increment_counter() |
| demo.c | 63 | 1.58 | 0.048445 | % 4.845 | increment_counter(); |
| demo.c | 74 | 1.51 | 0.046300 | % 4.630 | for (i = 0; i < 4000000; i++) |
| demo.c | 62 | 0.80 | 0.024530 | % 2.453 | for (i = 0; i < 2000000; i++) |
| demo.c | 80 | 0.79 | 0.024230 | % 2.423 | counter++; |
| demo.c | 81 | 0.30 | 0.009200 | % 0.920 | } |

Fig. 4

Source Order

| Filename | Line | Seconds | Portion | Percent | Text |
|---|---|---|---|---|---|
| demo.c | 65 | 0.00 | 0.00000 | % 0.000 | do_loop(); |
| demo.c | 66 | 0.00 | 0.00000 | % 0.000 | } |
| demo.c | 67 | | | | |
| demo.c | 68 | | | | static int a[4000]; |
| demo.c | 69 | | | | |
| demo.c | 70 | 0.00 | 0.00000 | % 0.000 | do_loop() |
| demo.c | 71 | | | | { |
| demo.c | 72 | | | | int i; |
| demo.c | 73 | | | | |
| demo.c | 74 | 1.51 | 0.04630 | % 4.630 | for (i = 0; i < 4000000; i++) |
| demo.c | 75 | 5.42 | 0.16621 | %16.621 | a[i%1000] = 1; |
| demo.c | 76 | 0.00 | 0.00000 | % 0.000 | } |
| demo.c | 77 | | | | |
| demo.c | 78 | 2.25 | 0.06900 | % 6.900 | increment_counter() |
| demo.c | 79 | | | | { |
| demo.c | 80 | 0.79 | 0.02423 | % 2.423 | counter++; |
| demo.c | 81 | 0.30 | 0.00920 | % 0.920 | } |
| demo.c | 82 | | | | |
| demo.c | 83 | 0.00 | 0.00000 | % 0.000 | add_to_list(name, age, sex) |
| demo.c | 84 | | | | char *name; |

Fig. 6

| Source Order | | | | |
|---|---|---|---|---|
| Filename Line | Seconds | Portion | Percent | Text |
| demo.c 74 | 1.51 | 0.04630 | 4.630 | for (i = 0; i < 4000000; i++) |
| 0x00000029a0 | 0.00 | 0.00000 | 0.000 | a010 2000 mov 0,%10 |
| 0x00000029a4 | 0.00 | 0.00000 | 0.000 | 1080 0000 b 0x13 |
| 0x00000029a8 | 0.00 | 0.00000 | 0.000 | 1010 0000 nop |
| 0x00000029ac | 0.21 | 0.00644 | 0.644 | 1110 0038 sethi %hi(0xe000),%o0 |
| 0x00000029b0 | 0.16 | 0.00491 | 0.491 | 9012 21f8 or %o0,0x1f8,%o1 |
| 0x00000029b4 | 0.24 | 0.00736 | 0.736 | 9012 2010 add %o1,0x10,%o1 |
| 0x00000029b8 | 0.01 | 0.00307 | 0.307 | 9a02 6004 ld [%o1+0x4],%o5 |
| 0x00000029bc | 0.55 | 0.01687 | 1.687 | 9a03 6001 add %o5,0x1,%o5 |
| 0x00000029c0 | 0.25 | 0.00767 | 0.767 | da22 6004 st %o5,[%o1+0x4] |
| demo.c 75 | 5.42 | 0.16621 | 16.621 | a[i%1000] = 1; |
| 0x00000029c4 | 0.43 | 0.01319 | 1.319 | 2300 0065 sethi %hi(0x19400),%11 |
| 0x00000029c8 | 0.20 | 0.00613 | 0.613 | a214 6074 or %11,0x74,%11 |
| 0x00000029cc | 0.16 | 0.00491 | 0.491 | 9210 23e8 mov 0x3e8,%o1 |
| 0x00000029d0 | 0.21 | 0.00644 | 0.644 | 9010 0010 mov %10,%o0 |
| 0x00000029d4 | 0.21 | 0.00644 | 0.644 | 4000 0000 call 0x48b |
| 0x00000029d8 | 0.17 | 0.00521 | 0.521 | 0100 0000 nop |
| 0x00000029dc | 0.23 | 0.00705 | 0.705 | 9912 2000 sll %g1,%o0+0l |
| 0x00000029e0 | 0.14 | 0.00429 | 0.429 | 9002 2001 add %o0,0x1,%o0 |
| 0x00000029e4 | 0.85 | 0.02607 | 2.607 | 8210 0001 mov %o1,%g1 |
| 0x00000029e8 | 0.15 | 0.00460 | 0.460 | a004 2000 st %o0,0x2,%o0 |
| 0x00000029ec | 0.17 | 0.00521 | 0.521 | 1700 0038 sethi %hi(0xe000),%o3 |
| 0x00000029f0 | 0.12 | 0.00368 | 0.368 | 9612 e1f8 or %o3,0x1f8,%o3 |
| 0x00000029f4 | 0.17 | 0.00521 | 0.521 | 9802 2000 add %o3,0x18,%o4 |
| 0x00000029f8 | 1.57 | 0.01748 | 1.748 | d403 2000 ld [%o4+0x4],%o2 |
| 0x00000029fc | 0.14 | 0.00429 | 0.429 | 9402 a004 add %o2,0x1,%o2 |
| 0x00000002a00 | 0.41 | 0.01257 | 1.257 | d423 2004 st %o2,[%o4+0x4] |
| 0x00000002a04 | 0.15 | 0.00460 | 0.460 | 0540 0f42 sethi %hi(0x3d0800),%g2 |
| 0x00000002a08 | 0.22 | 0.00675 | 0.675 | 8410 a100 or %g2,0x100,%g2 |
| 0x00000002a0c | 0.20 | 0.00613 | 0.613 | 80a4 0002 cmp %10,%g2 |
| 0x00000002a10 | 0.00 | 0.00000 | 0.000 | 06bf ffe6 bl 0xffffffe6 |
| 0x00000002a14 | 0.00 | 0.00000 | 0.000 | 0100 0000 nop |
| 0x00000002a18 | 0.00 | 0.00000 | 0.000 | 1110 0038 sethi %hi(0xe000),%o0 |
| 0x00000002a1c | 0.00 | 0.00000 | 0.000 | 9012 21f8 or %o0,0x1f8,%o1 |
| 0x00000002a20 | 0.00 | 0.00000 | 0.000 | 9202 2020 add %o0,0x20,%o1 |
| 0x00000002a24 | 0.00 | 0.00000 | 0.000 | da02 6004 ld [%o1+0x4],%o5 |
| 0x00000002a28 | 0.00 | 0.00000 | 0.000 | 9a03 6001 add %o5,0x1,%o5 |
| 0x00000002a2c | 0.00 | 0.00000 | 0.000 | da22 6004 st %o5,[%o1+0x4] |
| demo.c 76 | 0.00 | 0.00000 | 0.000 | } |
| 0x00000002a34 | 0.00 | 0.00000 | 0.000 | 81c7 e008 jmpl %i7+0x8,%g0 |
| 0x00000002a38 | 0.00 | 0.00000 | 0.000 | 91ee 0000 restore %i0,%a0,%o0 |

Fig. 8

```
Test Coverage
Exit
  Filename  Line  Seconds  Portion  Percent  Text
              322   324 325    326      327    320
*  demo.c    45    0.00  0.00000 %  0.000   counter++;
** demo.c    46    0.00  0.00000 %  0.000   printf("count = %d\n", ++count);
                                            ↑
                                            20
```

Fig. 10

```
Source Order
  Filename    Line  Seconds  Portion  Percent  Text
                342    344      346      348
                                                while (zero) {        ⎫
                                                  counter++;         ⎬ 350
*  0x00002774        0.00   0.00000  %  0.000   0300 0063    sethi  %hi(0x18c00),%g1
*  0x00002778        0.00   0.00000  %  0.000   d000 6330         ld     [%g1+0x33c],%o0
*  0x0000277c        0.00   0.00000  %  0.000   9000 2001        add    %o0,0x1,%o0
*  0x00002780        0.00   0.00000  %  0.000   0500 0063        sethi  %hi(0x18c00),%g2
*  0x00002784        0.00   0.00000  %  0.000   d020 a33c        st     %o0,[%g2+0x33c]
** demo.c      46                                 printf("count = %d\n",++count);   ⎫
*  0x00002788        0.00   0.00000  %  0.000   a004 2001        add    %10,0x1,%10  ⎪
*  0x0000278c        0.00   0.00000  %  0.000   9210 0010        mov    %10,%o1      ⎪
*  0x00002790        0.00   0.00000  %  0.000   1100 0038        sethi  %hi(0xe000),%o0  ⎬ 354
*  0x00002794        0.00   0.00000  %  0.000   9012 20f8        or     %o0,0xf8,%o0 ⎪
*  0x00002798        0.00   0.00000  %  0.000   4000 02b0        call   0x2b0        ⎪
*  0x0000279c        0.00   0.00000  %  0.000   0100 0000        nop                 ⎭
                                                        ↑
                                                       352
                                       340
```

Source Order

| Filename Line | Seconds | Portion | Percent | Text |
|---|---|---|---|---|
| demo.c 35 | | | | #define COUNT (sizeof(table) / sizeof(struct element)) |
| demo.c 36 | | | | |
| demo.c 37 | 0.00 | 0.00000 % | 0.000 | demoC() |
| demo.c 38 | | | | { |
| demo.c 39 | | | | int count; |
| demo.c 40 | | | | static int zero; |
| demo.c 41 | | | | |
| demo.c 42 | 0.00 | 0.00000 % | 0.000 | for (count = 0; count < COUNT; count++) |
| demo.c 43 | 0.00 | 0.00000 % | 0.000 | add to list(table[count].name, table[count].age |
| demo.c 44 | | | | while (zero) { |
| demo.c 45 | 0.00 | 0.00000 % | 0.000 | counter++; |
| demo.c 46 | 0.00 | 0.00000 % | 0.000 | printf("count = %d\n", ++count); |
| demo.c 47 | 0.00 | 0.00000 % | 0.000 | } |
| demo.c 48 | 0.00 | 0.00000 % | 0.000 | } |
| demo.c 49 | 0.00 | 0.00000 % | 0.000 | main() |
| demo.c 50 | | | | { |
| demo.c 51 | | | | int zero = 0; |
| demo.c 52 | | | | |
| demo.c 53 | | | | |
| demo.c 54 | 0.00 | 0.00000 % | 0.000 | demoC(0); |

Fig. 9

METHOD AND APPARATUS FOR OPTIMIZING TIME AND TESTING OF HIGHER LEVEL LANGUAGE PROGRAM

This is a continuation application of application Ser. No. 08/212,600 filed on Mar. 14, 1994, now abandoned.

BACKGROUND OF THE INVENTION

1. Field of the Invention:

The present invention relates to the art of software development for digital computing, and more particularly to the arts of (1) debugging and optimizing higher level language programs, and (2) testing procedures for higher level language programs.

2. Description of the Prior Art:

In the past, after computer programs are created, programmers must debug the program. Such programs are usually created out of many procedures and subroutines, each of which is a series of lines of source code intended to perform some specific task or function. "Subroutines," "functions" and "procedures" are self-contained segments of the program, comprising a group of source code lines that perform a specific function. Hereinafter in this specification, the term "source line" may be used from time to time as the same as and synonymous with the term "source code line" for ease and clarity in understanding and description.

Initially, a computer performs its tasks by "executing" machine code. Machine code is a series of machine instructions. Each instruction usually consists of a coded sequence of binary bits comprising a series of positives and negatives, ones and zeros or similar type of two level information. A digital processing apparatus responds to such machine instructions by operating upon other machine coded data stored in a memory, according to the program. A set of such machine instructions is loaded into a central processing unit of the digital processing apparatus, or computer from a memory called a machine instructions file. The memory device for both could be a disk, floppy disk, tape, read only memory (ROM), flash memory or the like. Thus, the central processing unit of the computer retrieves an initial machine instruction from the memory and carries out the tasks specified by the instruction. In carrying out or performing the specified tasks of the machine instruction, the computer is said to "execute" the machine instruction.

A machine instruction will not only operate upon the data in memory in accordance with the program, but will also instruct the central processing unit as to which machine instruction to retrieve and execute next. This process of executing one machine instruction after the next may continue indefinitely or until a machine instruction is executed that instructs the central processing unit to stop the execution process. Some digital processing apparatuses include improvements to speed up computer programs by allowing the computer to execute several machine instructions at once if it can do so, while still generally appearing to behave as if it is executing one at a time in sequence. Generally, such improvements do not change the fundamental sequential nature of the computer's execution process.

Machine code instructions can be represented in alpha-numeric expressions for display on display devices. Typically, moreover, computer manufacturers create a more human readable version of their machine code, called "assembly code" having its own "assembly language." The computer translates the assembly language into machine instructions for execution of the program. Assembly language makes it a somewhat easier task to program. However, such assembly languages are usually unique to that manufacturer's computers, and to make a program executable on another computer, the entire program must be rewritten in another's assembly language.

As a consequence, higher, or "high" level programming languages have been developed which are designed to run on all brands of computers. Using such higher level programs, a computer programmer can express general mathematical formulae and complex data relationships in a way that is independent of the actual brand of computer on which the program will be run. The computer programmer need not know what machine code language instructions will actually be used to implement his mathematical formulae. In this manner, the programmer can concentrate on the general specification of the algorithm without having to figure all of the detailed machine instructions necessary to carry out or execute his tasks. Among the more popular higher level programming languages are C, Fortran, Cobol, C++, Ada, Pascal and Lisp.

The indicia used to identify these higher level programming languages bear a resemblance to ordinary, written languages. Such indicia are usually written in alpha-numeric symbols, including various punctuation marks and characters, in a line from left to right. A single command created by a programmer in such a higher level language usually comprises a single line, but in any event is called a "source code line" or, more simply, a "source line." It is a series of such source lines of code that comprise the subroutines, functions and procedures that, collectively, will in turn comprise a complete program. Each of such subroutines, functions or procedures is itself a self-contained segment of the program, and each comprises a group of source code lines, source lines or instructions that performs a specific function or task. Such source lines are stored in a memory, called a source lines file. These source lines are stored in the source lines file in an order which, for purposes of this description, will be called the source order or, sometimes, the source code order. The alpha-numeric expressions or indicia representing each of such source lines can be displayed on a display device, and are usually presented in a column from top to bottom in the order in which the source code line or command is to be carried out in the fundamental sequence of the computer's run of the program. Generally, this order is coincidental with the source order.

Displays are usually provided which present the results of the computer's operations to the user. The display can take the form of a permanent medium, such as printed paper where the results of the computer are printed by a printer, as well as such media as magnetic implanted or recorded tapes, data disks and like devices which can be either human readable or understandable or machine readable. The display can be in the form of a transient medium, such a video terminal or screen. Video screens can be the usual cathode ray tube screen as well as liquid crystal displays, virtual reality displays, holographic displays and so on. Further, such displays are used not only to present the results of the computer's operation, but also to present various information from or through the computer, such as, for example, the data stored within the computer's memory, such as the machine code instructions, source lines file, diagnostic programs and other information kept in the computer's memory or in the memory of peripheral equipment attached to the computer. Hereinafter in this description, the term "display" shall be used and is intended to mean all of such display devices, as well as other media through or on which the results and other information from or through a computer can be presented to a user or another machine.

Most such digital processing apparatuses have some way of inserting codes, data and instructions into the computer. Such input devices include keyboards and/or some form of pointing devices. Pointing devices can be a light pen, a graphics tablet, arrow keys on a keyboard, a track ball or the "mouse" or "clicker" for positioning a pointer or cursor on the display screen or other output presentation.

"Interactive display" or "interactive display device" are terms that are sometimes used to refer to those displays that combine computer input and output functions. These devices allow the user to identify a location on the display so that the digital processing apparatus can then respond to that location identification as a command or instruction for further action or operation. Such a combination could be, for example, a video screen (cathode ray tube) and a pointing device, such as a "mouse" that moves a screen visible arrow or like cursor to identify a location among the indicia showing on the screen. Stylus sensitive liquid crystal display panels are another example of such an interactive display.

Another combination might be the screen display and a finger of the user's hand, where the screen display is sensitive to the finger's touch, and responds to that touch as if it were a command. Heads up displays, virtual reality displays and the like are additional such interactive displays.

The speed and reliability advantages afforded by higher level program languages cause most programs to be written in higher level languages. Many subroutines, functions and procedures can be very long, often containing hundreds and sometimes thousands of source lines. Furthermore, since the variations and permutations of possible functioning of these subroutines and functions is very large, it is impractical for the programmer to put the program through all possible tests, even assuming that he could know them all.

Instead, it is general practice to give a new program, after the programmer has performed rudimentary testing, to a number of testers who will exercise the program and all of its subroutines and functions more thoroughly in a variety of environments, applications, iterations and combinations. Typically, such testers identify those tasks and operations which the program cannot perform in the manner in which the tester has tried. In such testing, the tester usually identifies only those subroutines or functions which fail to perform their specific task assigned within the overall scheme of the program. Such testers normally are unable to thoroughly test all possible source code lines, many of which may malfunction under the circumstances which call for their use.

At the end of the testing, lists of these "bugs" are submitted to the programmer. The programmer can then make corrections to, or debug the program in light of the testers' feedback, and re-submit the debugged program to the testers for further testing. Sometimes, this process is repeated several times until an acceptably well functioning version of the program is achieved.

Generally, testers are unconcerned with the time that a subroutine or function takes in the run of the program. Programmers, however, have at least two circumstances in which the amount of time that it takes to execute the program can be important. The first circumstance is when a malfunction of a subroutine, function or procedure is identified that results in it accomplishing its assigned tasks too slowly so that the results of that subroutine, function or procedure are untimely for fitting into the remaining part of the program, which may depend on those results for performing the overall task. A second circumstance occurs when the subroutine or function performance time is too slow by comparison with alternative or competing products.

In the first circumstance, the program cannot be released until the problem is resolved. The subroutine, function or its component loop must be made faster or optimized, that is re-written. In the second circumstance, the program may be released, but its acceptance and use will likely be limited accordingly.

Where a subroutine, function or procedure, and likely the entire program malfunctions because some part of a subroutine or function is too slow for its assigned task in the scheme of the program, the subroutine, function or procedure must be made faster. Typically, programmers look to alternative subroutines and functions which are faster for substitution into the program.

Even after the program has been debugged and the problems fixed so that the program works correctly, it is often found that the program does not carry out its tasks at the speed desired. A user may complain that the program carries out its tasks too slowly, or that it takes too long to perform some of its tasks. Programs are sometimes written to take advantage of certain features of one make of computer. Although the program will run on most other makes of computers because it is written in a higher level language, the other makes of computers in many instances will run that particular program slower than on the make for which it was originally written. A user having a program that runs too slowly on his particular computer may desire greater speed in order that his computer may handle more programs, or handle more tasks.

One solution to this problem of time or speed is to acquire a new computer on which the program will be run at a greater speed. This solution, however, can be costly.

In the past, certain performance analysis hardware and software have been provided that give the amount of time used by the most often executed machine instructions. The higher level language programmer, however, usually does not know the machine instructions into which his source lines are translated. Most programmers are not helped, therefore, by knowing how much time was used by any one individual machine instruction.

Further, it has been known to provide hardware and software that identify those segments of the program, such as subroutines, functions and procedures that use the most time. However, as noted, such functions, subroutines and procedures often consist of hundreds, even thousands of lines of source code. Such hardware and software do not identify which of these source lines use the most time when their corresponding machine code instructions are executed.

It is an object of the present invention to identify source code lines for which the time of use, or the amount of time spent to execute the machine code instructions into which the source lines have been translated, is the most. It is a further object of the present invention to provide and display the amount of time spent in the execution of the machine instructions for their corresponding source code lines. It is another object of the present invention to identify the source lines that are used repeatedly. It is yet another object of the present invention to provide a method and apparatus which can make these identifications displayed to the programmer in order according to the amounts of time so spent. It is yet a further object of the present invention to provide a method and apparatus which can present these identifications to the programmer in the source order provided by the source line file and in the likely order of sequential performance.

Testing procedures are frequently provided for testing a program, function or sub-routine. Such testing procedures often include running a program by or with test input and analyzing the results. However, many such testing procedures do not test all of the source code's lines. Indeed, frequently it is not known whether all of the source lines are used in a testing procedure. Therefore, the tester cannot verify whether every source code line is satisfactory. Worse, a program tester may develop an invalid belief in the operability of every code line in every application for which the program was designed.

It is another object of this invention to provide testers with a procedure for more easily ascertaining the completeness of a testing procedure, and to provide methods and apparatus for correcting deficiencies found.

SUMMARY

In brief, in accordance with one aspect of the present invention, all or part of a program of a higher level language composed of source code lines is analyzed by initially determining the amount of time spent by the program during all or a portion of a run of the program to execute machine instructions into which each source code line has been compiled. The source code lines for all or a portion of a program are arranged in the order of descending times spent for their correlating machine instructions' execution. The time spent that correlates with each source code line is calculated also as a percentage of the total amount of time spent for running the program or a portion of it. The source code lines are identified by titles or part of their text in a source code line list in one column of a display or read out, while an indication of the time correlative to each source code line is listed in an another, nearby column, each correlated time spent being positioned juxtaposed its corresponding source code line.

From this display or read out, a selection of the source code line or lines believed to present the greatest opportunity for optimizing the program is made. For each selected source code line, indicia identifying the selected line is displayed along with indicia identifying additional source code lines proximal the selected source code line in the order of location in the source line file, or in the operational order of performing or carrying out the sub-routine. In this sequential order display, the amount of time spent with respect to each of the displayed source code lines is shown juxtaposed its corresponding source code line indicia. In addition, the indicia representative of the machine code instructions into which each source code line has been compiled can be shown for each source code line, complete with time spent to execute each of the machine code instructions, if desired.

In an alternative embodiment, those machine instructions which were not used in a test procedure are first located. The source line from which the unused machine instruction was translated is then identified. All such source lines thus identified are listed. Any one of such listed source lines can be selected for further scrutiny, and the selected source line is displayed along with other source lines proximal to the selected source line in the order as maintained by the source lines file or the order of being carried out during a run of the program or a portion thereof. The source code line is displayed at least in part by some or all of the text of the source line and, further alternatively, along with machine instructions into which the source code line had been translated. The machine instructions are expressed in the display in their alpha-numeric form. Appropriate corrective or supplemental test programs or routines can then be created to insure that all source code lines are used in an appropriately modified testing procedure.

These and other novel aspects of the present invention, together with other aspects thereof, can be better understood by the following detailed description of the preferred embodiments, which are designed to be read in conjunction and together with the accompanying drawings.

BRIEF DESCRIPTION OF THE DRAWINGS

FIG. 3 is a display showing one aspect of the preferred embodiment of the present invention in a time spent order display for source line to time data;

FIG. 4 is a display showing another aspect of the preferred embodiment of the present invention in a file order display for source line to time data;

FIG. 6 is a display showing one aspect of the alternative embodiment of the present invention in a source line and machine instruction to time display;

FIG. 8 is a display showing one aspect of the alternative embodiment of FIG. 7 in a time spent order display for source line to time data;

FIG. 9 is a display showing another aspect of the alternative embodiment of FIG. 7 in a file order display for source line and machine instruction to time data; and, FIG. 10 is a display showing another aspect of the alternative embodiment of FIG. 7 in a source line and machine instruction to time display.

DETAILED DESCRIPTION OF THE PREFERRED EMBODIMENT

Figure 1:
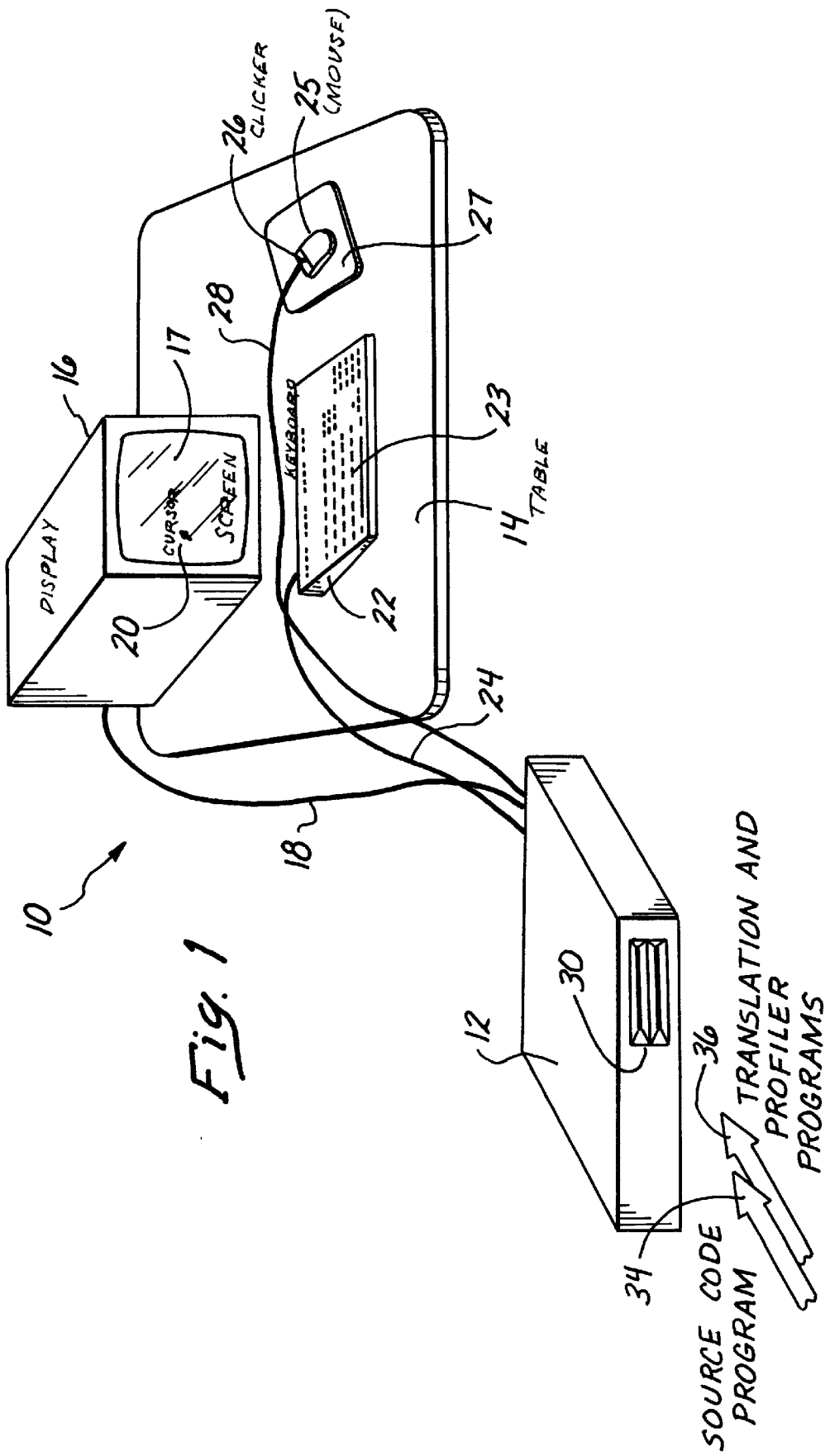
FIG. 1 is a perspective schematic view of a digital processing apparatus of the preferred embodiment of the present invention.

A digital processing apparatus 10, or computer has a central unit 12, reference being had initially to FIG. 1 of the accompanying drawings. The central unit 12 houses a central processing unit, disk drive and memory, as will be explained in greater detail below. A table 14 holds a cathode ray tube (CRT) display 16 having a screen 17. The cathode ray tube display 16 is connected by bus 18 to the components of the central unit 12. A cursor, or display pointer 20 is displayed on the screen 17, and is movable over the area of the screen 17 in response to input from the keyboard 22. The keyboard 22 has keys 23 for human input to the computer 10. The keyboard 22 is electronically connected to the central unit by bus or cable 24. The pointer or cursor 20 may be moved up, down, and in both lateral or side directions by depressing the appropriate keys 23, as shown, marked with the arrow in that direction toward which it is desired to move the pointer or cursor 20.

Another method and apparatus for moving the pointer or cursor 20 is by maneuvering the "mouse" 25, having a "clicker" 26. By moving the mouse 25 in a desired direction on a mouse pad 27 on the top of the table 14, the pointer or cursor 20 will be moved in generally a relatively corresponding direction on the screen 17. The mouse 25 is electronically connected to the keyboard 22 by bus 28, for manual input of signals to be conveyed to the components of the central unit 12 through bus 24, and on to the cathode ray tube display 16 through bus 18. Many computers can use both arrangements.

A source code program 34 is installed in the central unit 12 by inserting a disk having the program on it into the drive port 30 and is downloaded into a source lines file 56, which will be described in greater detail below. Similarly, the translation or compiler and profiler program 36 is installed in the central unit 12 by inserting a disk having such information on it into the drive port 30.

Figure 2:
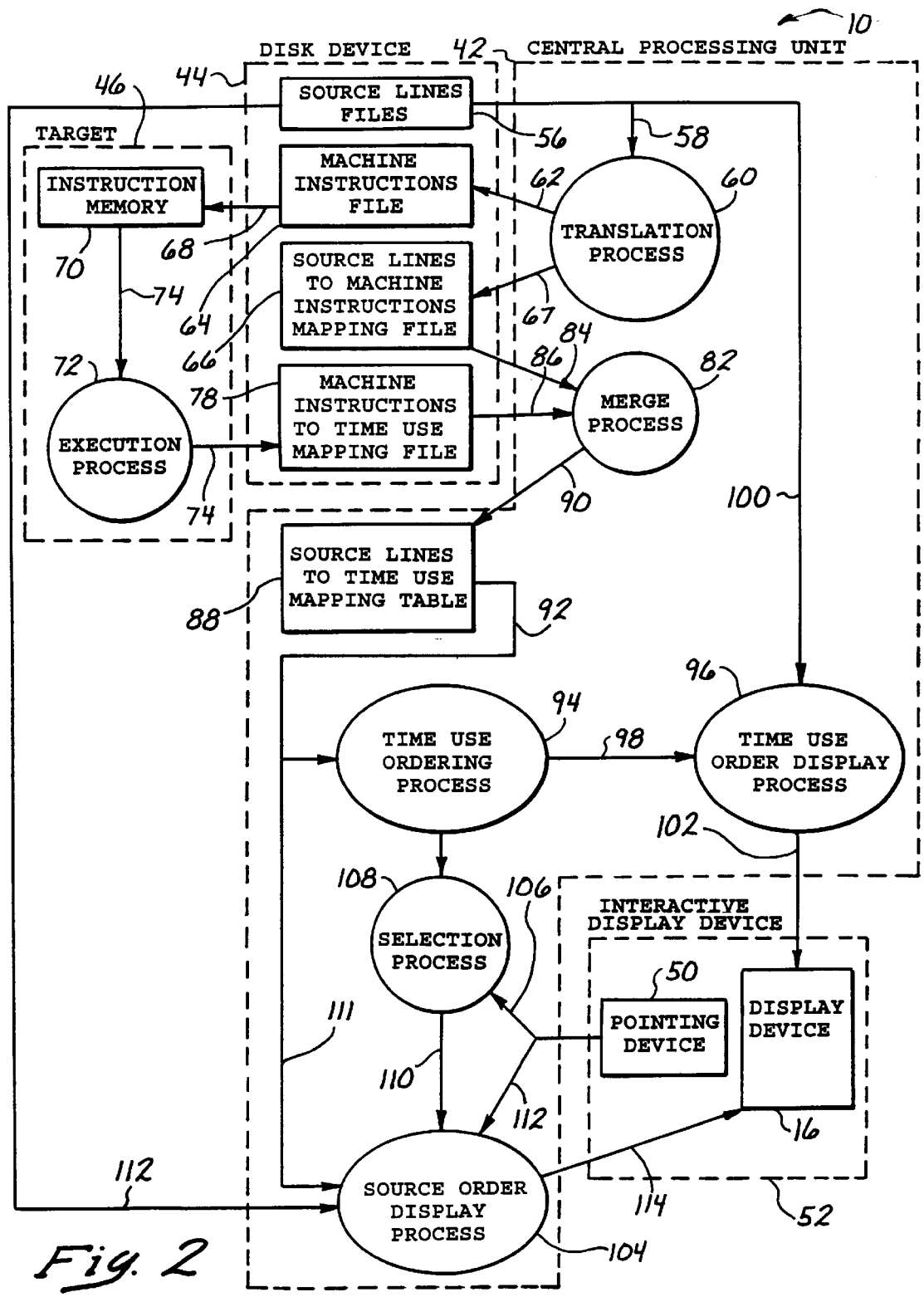
FIG. 2 is a block, schematic diagram of the method of the preferred embodiment of the present invention.

FIG. 2 is a more detailed, but diagrammatic arrangement of some of the component parts, and sets forth in a block flow diagram methods of practicing the present invention. The central unit 12 contains a central processing unit (CPU) 42 which is interconnected with a disk drive and memory unit 44. A target CPU 46 is the unit that will control the run of the program to be analyzed. The pointing device 50 comprises the cursor or pointer 20 moved by corresponding movement of the mouse 25 on the table 14. Some systems operate using a cursor 20 moved by the arrow labeled keys 23 on the keyboard 22. The pointing device 50 is part of the interactive display 52, which includes the cathode ray display 16.

Initially, the program in the form of a source code 34 is inserted into the central unit 12 by inserting the disk on which it is stored into port 30. The source code 34 is transferred to the source lines file 56 in the disk drive and memory 44. A compiler program, called a translator is also transferred into the central unit 12 by inserting it, as by inserting the disk on which they are stored into port 30. The compiler or translator draws the source lines information from the source lines file 56, as indicated by line path 58, and translates, in the translation process 60, the source lines of the source lines file 56 into the machine instructions necessary to execute the operations called for by the analyzed program. The machine instructions are stored in the machine instructions file 64 by the compiler or translation operation 60, as indicated by the line path 62.

Typically, a computer 10 operates by running a program which has been installed in it. The program consists of a machine code or instruction list, which instructs the computer to execute various tasks, as set forth in the codes. As set forth in FIG. 2, the program under scrutiny has been established in the target CPU 46 by storing its code in the form of machine instructions in the instructions memory 70, as indicated by line path 68. When operating, the execution process 72 causes the instructions from the instructions memory 70 to be accessed, performed or carried out, as indicated by line path 74.

In the preferred embodiment described here, the central processing unit 42, disk drive and memory unit 44 and target CPU 46 combination which was used and found suitable is the Sparcstation IPC, using a SunOS Release 4.1 (GENERIC_SMALL) #1 operating system, available from Sun Microsystems Inc. of Mountain View, Calif. In this Sparcstation IPC, the target CPU 46 is part of the central processing unit 42. The program under scrutiny was a program written in the C language, and was downloaded from the disk on which it was stored into the source lines file 56 by placing the disk through the port 30 in the central unit 12. The analyzed program is given in the C language in Appendix B, attached hereto and made and part hereof and incorporated herein by this reference. The program was then compiled, that is translated 60 into machine instructions on which the computer 10 can execute the commands which will run the analyzed program. The translation was accomplished using a C-SPARC compiler, version 1.8.7 available from Green Hills Software Inc. of Santa Barbara, Calif. The translation compiler program is inserted into the central processing unit 42 of the Sparcstation IPC 10 by inserting the disk having the program on it into the port 30 of the central unit 12, following the installation instructions of the compiler program. The translation 60 is accomplished by giving the computer 10 the command "gcc -a -p -g demo.c".

The machine instructions are then stored in the machine instructions file 64, named here "a.out". Contemporaneously, the translation process 60 creates a source lines to machine instructions address table and stores it in the source lines to machine instructions mapping file 66 in the memory 44, as indicated by the line path 67, in the file "a.out". Although the source lines to machine instructions file 66 in this embodiment was generated using the C-SPARC compiler described above, any compiler that provides, for each line of source code, the addresses of the machine instructions into which the source code line was translated will operate suitably to provide a satisfactory source lines to machine instructions file for the practice of this invention. Such information is often contained in a source code debugger symbol table prepared for use by a source level debugger program.

The profiler source code program is installed into the Sparcstation IPC 10 by inserting the disk having the program on it in the port 30 and compiling it in the central processing unit 42. The source code program is set forth in the Appendix A, which is attached hereto and incorporated and made a part of this specification by this reference. The profiler source code program is written in the C language, and is stored in two files, labeled "merge. c" and "wstuff.c" by giving the instruction or command "gcc merge.c wstuff.c -ansi -w-lx11".

The program under scrutiny is run 72 by giving the command "a.out". This command copies the machine code instruction from the machine instruction file 64 into the instruction memory 70 and then carries out the execution process 72. During the execution 72 of the run of the analyzed program, the central processing unit 42 is sampled a periodic number of times for identification of which machine instruction is being executed or being carried out at the moment of sampling. A sample rate of 100 times per second has been found adequate for a close and accurate approximation. The sample rate may be chosen from a wide range, depending on the nature of the program under scrutiny. From this sampling, an accurate and satisfactorily close approximation of the amount of time spent by this Sparcstation IPC 10 in executing each machine instruction used in the program is determined. This information is stored, as indicted by line path 74 in a machine instructions to time use mapping file 78 in the disk drive and memory unit 44.

From the information kept in the machine instructions to time use mapping file 78, and from the information kept in the source lines to machine instructions mapping file 66, a merge process 82 can be carried out to assemble and establish the amount of time spent by the data processing apparatus 10 in executing the machine instructions into which each line of the source code, or source line has been translated by the compiler or translation process 60. The amount of time spent, correlating to each source line, is stored in the source lines to time use mapping table 88 in the central processing unit 42, as indicated by line path 90.

The merge process 82 is commenced by the command "perf a.out" given to the Sparcstation IPC 10. In this merge process 82, the machine instructions for each source line are identified from the source lines to machine instructions mapping file 66. This information is used in the merge process 82, as indicated by the line path 84. The approximated amount of time spent executing each machine instruction in a run 72 of the program 46 is obtained from the machine instructions to time use mapping file 78, as indicated by line path 86. From this accumulated information, the merge process 82 determines a close and accurate approximation of the time used or time spent correlating to each source line used in the program. During the merge process 82, the time spent information is in the source lines to time use mapping table 88, as indicated by the line path 90, and is passed to the time use ordering process 94 and the source order display process 104 as indicated by the line paths 92, 111.

In the present embodiment, the actual source lines of the program to be analyzed are stored in the source lines file 56, labeled "demo.c" and the machine instructions are stored in the machine instructions file 64, labeled "a.out". The mapping files 66, 78, 88 have addresses for the corresponding source lines and machine instructions for access to the source lines and machine instructions information, as needed.

A time use ordering process 94 for arranging the source lines in an order according to the amount of time spent in executing the machine instructions into which each source line has been translated, is used to access the information needed for this procedure from the source lines to time use mapping table 88, as indicated by the line path 92. This process 94 then prepares a table having each determined amount of time spent juxtaposed its corresponding or correlated source line. A time use order display process 96 takes this arrangement with its source line address information, as indicated by the line path 98, and combines it with the actual source line information from the source lines file 56, as indicated by the line path 100, and prepares as an output a display for presentation of this information on the screen 17 (FIG. 1) of the display 16, as indicated by the line path 102. In this preparation, indicia representing the source line and indicia representing the time spent are assigned to each of such information for presentation on the screen 17. The source line could be represented, for example, by a file name and line number or abbreviated name, and/or might be represented by all or a portion of the text of the source line itself from the source lines file 56. The time spent could be given or expressed in the actual amount of time spent in absolute terms, such as in seconds, milliseconds, nanoseconds, clock counts or the like. The amount of time spent correlating to each source line could also be presented, very usefully, as a relative proportion of the total amount of time spent in the program run, and/or with a percentage representation.

In FIG. 3, the first result of this merge process 82, time use ordering process 94, and time use order display process 96 is shown as a representative screen display 116. Screen display 116 shows indicia identifying the time spent in executing the machine instructions into which each of several of the source lines had been translated, along with some indicia identifying the correlating source line.

In particular, in FIG. 3 a first column 118 lists the seven most significant source lines, in terms of determined correlated amounts of time spent, in the order of descending times spent for each source line in executing the machine instructions into which that source line had been translated. The source lines are identified by their address or "line" numbers and file name, here "demo.c" plus a line number, for example "75". A second column 120 lists the actually determined time spent with each of the displayed, correlated source lines of column 118, expressed in seconds. A third column 121 lists the amount of the determined time spent for each displayed, correlated source line as a proportion of the total amount of time spent in completing the run 72 of the program under scrutiny. A third column 122 lists the amount of the determined time spent for each displayed, correlated source line as a percentage of the total time for the program run 72. Each time amount, proportion of time and percentage of time is positioned on the display screen 116 juxtaposed to the indicia 118 representing its correlated source line, in a row across the screen 116. In a fourth column 123 on the screen display 116, at least a portion of the actual source line text is given in the row for that source line.

A marker or cursor 124 is shown positioned at one source line 126, which is identified by the indicia "demo.c 75". The cursor 124 is positioned by a user by maneuvering the pointing device 50, shown in FIG. 2, which is a part of the interactive display 52. In this embodiment, the cursor arrow is moved by maneuvering the mouse 25 on the mouse pad 27 on the table 14. In some systems, the cursor 124 could be maneuvered by operation of the up, down and lateral arrow marked keys 23 of the keyboard 22. The pointing device 50 thus is made to select a particular source line 126 for further scrutiny.

By entering some signal in the line path 106, by a click on the clicker 26 when the display arrow 20, 124 is positioned adjacent the file name and address for the source line "demo.c 75" in column 118, the user selects the source file identified by this indicia for closer examination, and starts a selection process 108 to commence, as indicated by the line path 106 of FIG. 2. In other configurations, this selection could be made by the user by entering some key signal through the keyboard 22 to move the cursor and enter some commence signal.

The selection process 108 identifies the particular source line 126 selected by the user using the time spent or time use table on the screen 116, and through line path 110 provides this information to a source order display process 104.

The source order display process 104 accesses the source lines from the source lines file 56 through line path 112, and arranges the selected source line 126 along with other source lines proximal to the selected source line 126 in the order as kept in the source lines file 56. Usually, this order is the same as the order in which the data processing apparatus 10 carries out the tasks specified by the source lines in the analyzed program.

The source order display process 104 also takes information from the source lines to time use mapping table 88 to complete the preparation and arrangement of the information which will be displayed. The source order display process 104 then prepares the indicia identifying the source lines in the order as kept in the source lines file 56 for display on the screen 17 of the display 16, as indicated by the line path 114.

In FIG. 4, the screen display 130 prepared by the source order display process 104 is shown. Indicia identifying the selected source line 126 is displayed in the first column 131 along with indicia identifying the source lines proximal to the selected source line 126 in the order as kept in the source file 56. The selected source line can be located from the location or line number "75" in the identifying indicia. In different environments, the selected source line 126 might also be called to the attention of the user by the pointer or cursor 138, positioned at the source line numbered "75" in the screen display 130. Thus, the first column of the screen display 130 is a list of indicia indicating the address locations for various source lines, in the order of the source lines kept by the source lines file 56, for those source lines having addresses proximal to the selected source line 126.

The second column 132 of screen display 130 comprises a list of the determined times spent correlating to each of the source lines displayed, each determined time spent being in a row juxtaposed its correlated source line. The third column 133 of the screen display 130 is a list of the determined times spent, expressed as a relative proportion of the total time spent executing the machine instructions correlating to the various source lines. The percentage for each correlating source line also is given, in the fourth column 134 juxtaposed to the identifying location address for the correlating source line. Thus, for example, the percent for source line identified as "demo.c 75" is 16.621%, as set forth in the fourth column 134 in the screen display 130 of FIG. 4. The fifth column 136 of the screen display 130 is a presentation of all or a part of the actual text of the corresponding source lines from the source lines file 56. The text for each source line displayed is given juxtaposed to the corresponding address location information and various expressions of the determined times spent set forth in the first through fourth columns 131, 132, 133, 134.

In operation, a user may identify source lines where the greatest or best opportunity exists for optimization or improvement in a computer 10 operation, where the source lines of the analyzed program 34 have been installed in a source lines file 56, and the source lines have been compiled or translated into appropriate machine instructions file 64. Initially, a source lines to machine instructions mapping file 66 is established in the memory 44 by the translation process 60. Next, a run or execution 72 is made of the program having the source lines 56 under scrutiny. A machine instructions to time use mapping file 78 is created by the sampling of the computer 10 during an execution process 72.

A merge process 82 takes the information from the source lines to machine instructions mapping file 66 and from the machine instructions to time use mapping file 86, and determines an amount of time spent by the computer 10 in its run 72, that is indicative of the amount of time spent or used by the computer 10 for execution of the machine instructions for each source line 88. This information is stored in the source lines to time use mapping table 88. Through a time use ordering process 94 and a time use order display process 96, a screen display 116 is presented on the display 16 of the interactive display 52. This display 116 identifies the most significant source lines as determined by the amount of time spent by the computer 10. Moreover, the display 116 reports in column 120 and in column 122, close and accurate approximations of the actual amount of time spent by the computer 10 in executing the machine instructions for each source line set forth in this most significant source line list 118. This display 116 helps the programmer to identify those source lines where, if time and speed improvements were made, he would have the most significant effect on the overall execution 72 of the program under scrutiny.

Continuing in the operation, the programmer can select one of the source lines 126 for further and more close scrutiny by positioning the cursor 124 on the screen 116 at the indicia for that line. By using a keyboard key, or by clicking or otherwise singling out this selected source line 126 by using either the directions keys 23 on the keyboard 22 and entering, or by positioning the pointer-cursor 20 with the mouse 25 and using the clicker 26 in the selection process 108, the source order display process 104 takes the selected source line 126, and takes from the source lines file 56 the source lines proximal to the selected source line 126 as maintained by the source line file 56, and arranges the selected source line 126 and these proximal source lines in that order of the source line file 56. Normally, as mentioned hereinabove, this order is coincidental with the time, fundamentally sequential order of execution of the machine instructions corresponding to the source lines.

This arrangement is presented, as indicated by the line path 114 to the display 16 and displayed, as representatively shown for an example in FIG. 4 as screen display 130. As shown, the indicia identifying the source lines displayed on screen display 130 are given the actual text, or at least a line of the actual text, in the higher level program language, of each source line. In addition, for each source line displayed, the amount of time spent or used by the computer 10 in executing the machine instructions corresponding or correlating to that source line is also displayed in a second column 134 in percent of the total time spent during the program run 72. In a first column 132, an identifying indicia, in this case the file location address, is displayed juxtaposed its corresponding source line text.

In the manner set forth, a programmer is able to have that source line causing the most time consumption, or at least enough of a time consumption to be interesting. If changes are to be made to any source line to obtain speed advantages, changes to such lines as identified by the present method will maximize the effect on the overall run time of the program being scrutinized. In considering any such modification, the programmer has before him in screen display 130, not only the source lines where the greatest opportunity for maximum effect exists, but also the source lines proximal to those source lines of interest. Thus, the programmer can quickly observe the location of the source lines of maximal interest within the overall run of the program. The programmer will know those source lines just before and just after the source lines of maximal interest. Additional opportunities may be discovered for optimization of the program by modifying these proximal source lines in conjunction with the targeted source line.

Figure 5:
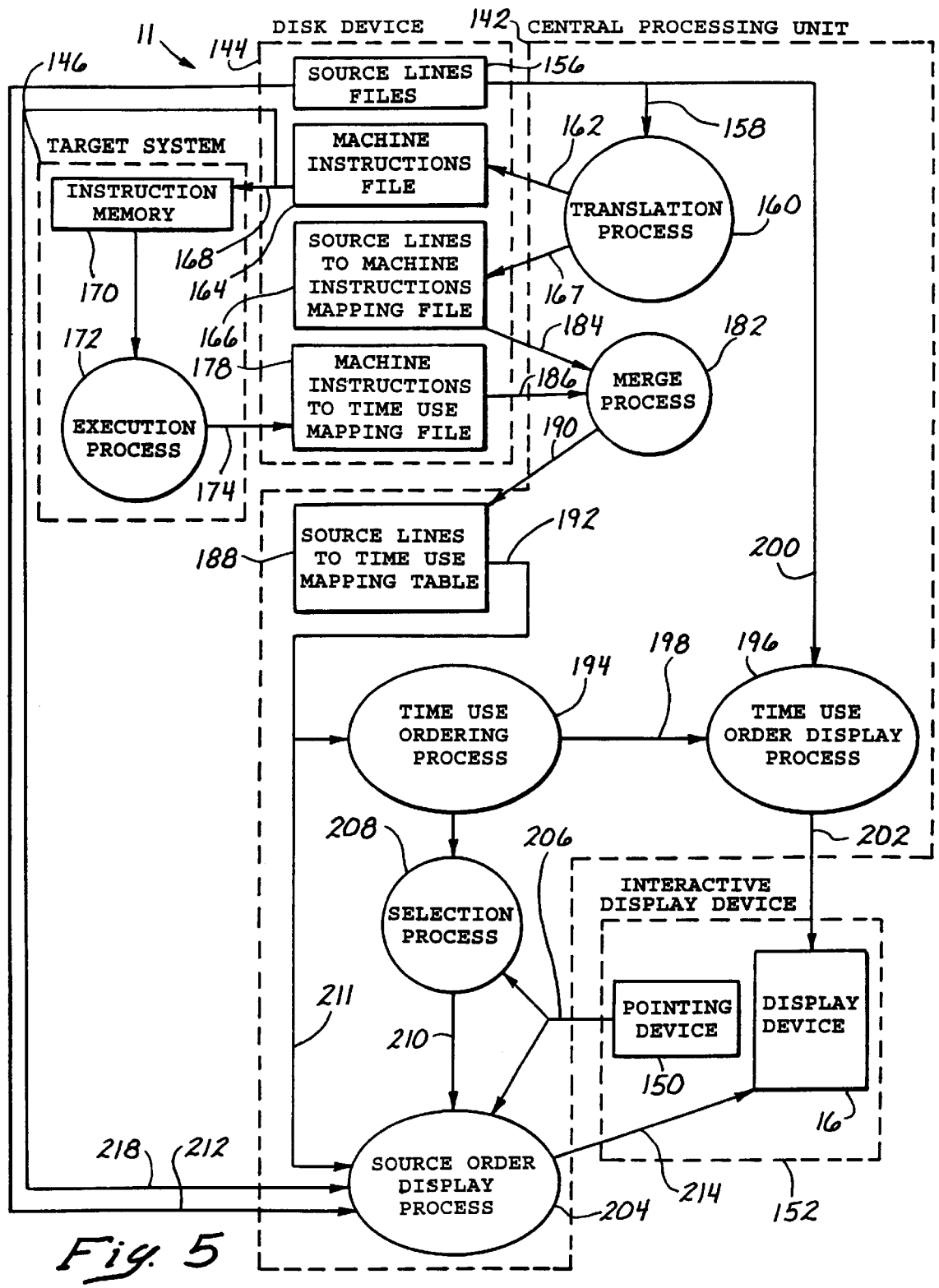
FIG. 5 is a block, schematic diagram of the method of an alternative embodiment of the present invention.

In FIG. 5, an alternative embodiment of the present invention is shown in schematic, diagrammatic view where, for ease and clarity in description the reference numerals are the same as those for elements shown in FIG. 2 except being numerically one hundred greater. Thus, a central processing unit 142 and disk drive and memory unit 144 comprise the basic elements of the computer 11. A target CPU 146 has a program which is to be analyzed. A pointing device 150 and display 16 comprise the interactive display 152.

The same source code 34 and a translation and profiler program 36 as used in the preferred embodiment described above, are loaded into the computer 11. The source code 34 is stored in the memory 144 in the source lines file 156. The translation program, using the same command instructions as set forth for the preferred embodiment above, compiles or translates the source lines in a translation process 160, and loads 162 the resultant machine instructions into a machine instructions file 164. The source code program set forth in the Appendix A is again loaded into the Sparcstation IPC 11, and is put into two files, again using the same instruction as set forth for the preferred embodiment above. In addition, consequently, the translation process 160 creates a source line to machine instruction map and loads 167 it into a mapping file 166. The analyzed program 34 is run by an execution process 172, upon the same command instruction as set forth for the preferred embodiment above, taking 174 machine instructions from the instruction memory 170, which receives 168 them from the machine instructions file 164. A machine instructions to time use mapping file 178 is created from a sampling of the program during its run 172.

To this point, this alternative embodiment is similar in method and structure to the preferred embodiment described above. However, here a merge process 182 is commenced by a different command to the program of the Appendix A, namely "perf -asm a.out". The merge process 182 then takes 184 the information from the source lines to machine instructions mapping file 166, and takes 186 the information from the machine instructions to time use mapping file 186 to determine with respect to each source line, the amount of time spent by the computer 11 in executing the machine instructions into which each such source line has been translated and stores this information into the source lines to times use mapping table 188.

A time use ordering process 194 takes 192 the information from the source lines to time use mapping table 188 and arranges the source lines in descending order according to the determined amount of time spent. A time use order display process 196 takes 198 this arrangement, and takes 200 the source lines information from the source lines file 156, and prepares a display having indicia representing source lines, and their corresponding times spent, from accurate and close approximations of the actual time spent in seconds, clock counts or the like, or from accurate and close approximations of the relative proportions of the time spent correlating to each source line, in relation to the total time spent running the program, expressed, for example, in percentages.

A pointing device 150 is used to position a cursor or pointer 20 to select 206 a particular source line, such as the source line identified by the indicia "demo.c 75" as was selected in the preferred embodiment described above. A selection process 208 instructs 210 the source order display process 204 to take 212 information from the source lines; file 156, and to take 211 information from the source lines to mapping table 188, in order to prepare a display that will have for the selected source line and the source lines proximal to it in the order as kept by the source lines file 156, all or some of the text for the source lines, the location address of the source lines in the source lines file 156, and the time spent in executing the machine instructions correlating to each source line.

In this alternative embodiment, the source order display process 204 accesses information from the machine instructions file 264, as indicated by the line path 218, so as to have, in addition to the information set forth above, sufficient information to present in the display the alpha-numeric code text for the machine instructions which carry out the source line instruction. This information is assimilated and displayed.

In FIG. 6, a screen display 220 resulting from the selection of the source line indicia "demo.c 75" is shown. The information is shown, again, in columns. The first column 222 is a list of indicia 225 identifying not only the selected source code "demo.c 75", but also indicia 226 identifying all of the machine instructions into which source line "demo.c 75" was translated during the translation process 160. Furthermore, the indicia 224 identifying additional source lines, entitled "demo.c 74" and "demo.c 76" which are proximal to the selected source line "demo.c 75" 225 as kept in the source lines file 156 are listed in the first column 222. Even cursory scrutiny of the first column 222 reveals that certain of the machine instructions take substantially more time for execution than others. The machine instruction indicated by indicia 228, "0x000029ec" takes 0.85 seconds, which is 2.607% of the time spent by the computer 11 in running the analyzed program. Other significant machine instructions can be determined from the screen display 220.

In the second column 230, juxtaposed each machine instruction indicia displayed is the actual time spent by the computer in executing that corresponding machine instruction. The total amount of time for all of the machine instructions for a given source line is set forth juxtaposed the indicia 224, 225 identifying that source line. Thus, for the source line identified as "demo.c 75", the amount of time determined is 5.42 seconds.

The third column 232 lists the amount of time spent in executing each machine instruction listed in the first column 222, as a proportion of the total amount of time used or spent for the execution process or run 172 of the analyzed program. The fourth column 234 lists the amount of time spent in executing each machine instruction listed in the first column 222, as a percentage of the total amount of time spent or used by the computer 11 for the execution process or run 172 of the analyzed program.

The fifth column 236 lists the actual machine instructions in hexadecimal form.

The sixth column 238 gives the actual text, in assembly language, for each of the machine instructions listed in the first column 222, juxtaposed the indicia identifying the corresponding machine instruction. In this fifth column 236 is also given the actual text, or at least part of the text of the source lines having identifying indicia displayed, again juxtaposed in the row for that source line.

In the manner described, the programmer faced with the task of making an analyzed program run faster, can locate and identify those machine instructions where, if speed progress or improvement modifications are made, will result in the most significant effect on the overall time of the program's run. For example, there are available programs that optimize machine instructions, the use of which having the effect of making the execution of such a machine instruction faster. Such optimizations can provide substitutions for many of the machine instructions in the program in certain circumstances, by the programmer to obtain the speed and time efficiency desired.

Figure 7:
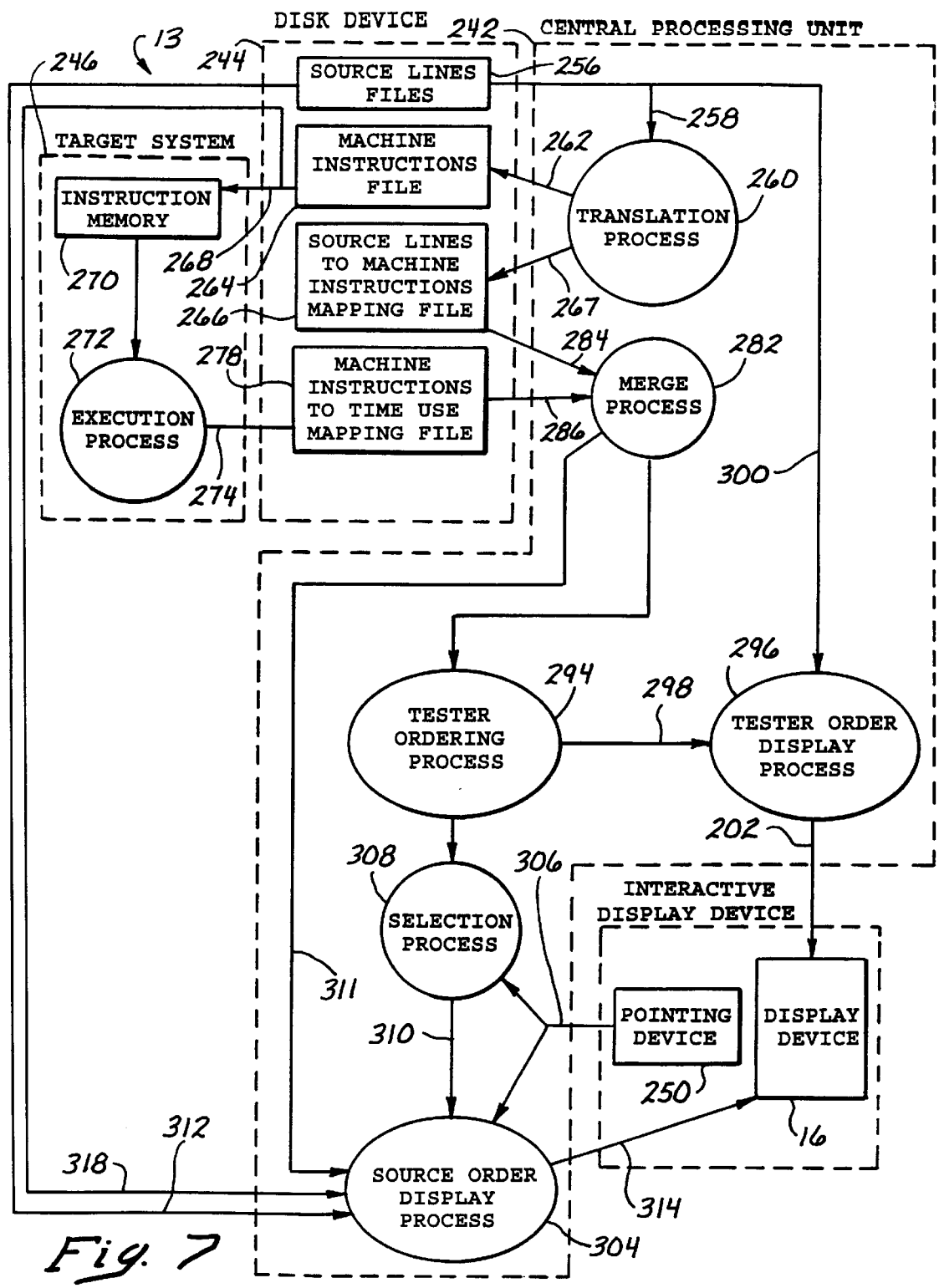
FIG. 7 is a block, schematic diagram of the method of another alternative embodiment of the present invention.

In FIG. 7, another alternative embodiment of the present invention is shown in block, schematic diagram, where for ease and clarity in description and understanding, all of the reference numerals used are those for similar elements and components in FIG. 2 of the drawings, except having a numeric value two hundred greater. Thus, the computer 13 has a central processing unit 242, a disk drive and memory 244 and the target CPU 246, which in the embodiment described here is integral with the central processing unit 242 as part of the Sparcstation IPC described hereinabove for the preferred embodiment. A program to be tested is downloaded into the source lines file 256. That program, written in the C language, is set forth in Appendix B attached hereto, and incorporated herein by this reference. The same compiler as described for the preferred embodiment described above, is downloaded into the central processing unit 242 to translate in the translation process 260 source lines of the program to be tested. The translation process 260 takes 258 the source lines from the source lines file 256, and compiles, that is translates the source lines into machine instructions, and loads 262 them in the machine instructions file 264. The translation process 260 also creates a source lines to machine instructions map and loads 267 it in the source lines to machine instructions mapping file 266. The source code program set forth in Appendix A attached hereto, and incorporated herein and made a part hereof by this reference, is again loaded into the Sparcstation IPC and put into two files, in the same manner and using the same command as described for the preferred embodiment above.

The program to be tested is run by an execution process 274 in the target CPU 246, commenced by an execution command "perf -coverage a.out". The machine instructions are taken 268 from the machine instructions file 264 into the instruction memory 270, and the execution process 272 produces and transfers 274 to a machine instructions to time use mapping file 278 a map of the time taken by the computer 13 during the testing run 272 of the tested program, to execute each machine instruction.

A merge process accepts 284 information from the source lines to machine instructions mapping file 266, and accepts 286 information from the machine instruction to time use mapping file 278, and determines first those source lines for which none of the machine instructions into which the source line was translated, was executed during the test run of the tested program. The merge process then arranges all such source lines of the tested program in the source order kept in the source lines file 256 by the computer 13. The results of this tester ordering process 294 are made available 298 to the tested order display process 296. The tester order display process accepts 300 information from the source lines file 256 and accepts the information made available 298 from the tester ordering process, and prepares the information in the tabular form for presentation on the screen display in cathode ray tube display 16.

In FIG. 8, a resultant screen display 320 shows the results of the merge, tester ordering and tester order display processes 282, 294, 296. In screen display 320, a first column 322 lists those source lines where a machine instruction into which the source line was translated by the translation process 260, was not execution during the test run 272 of the tested program. In this first column 322, the identified source lines are listed by indicia comprising the program name and the source line file number. In the second column 324, the amount of time is set forth, which, of course, should be zero, as should be the proportion of the time spent versus the total time of the run 372, given in the third column 335, and the percentage of the time spent versus the total time of the run 272 given in the fourth column 326.

In the fourth column 327, at least a portion of the text of the corresponding source lines identified in the first column 322 is set forth. All of the relevant information for an identified source line is displayed in a row across juxtaposed to the source code identified on that row. As shown in FIG. 8, those source lines having no machine instructions which were executed during the testing run 272, are called to the attention of the user by an asterisk, "*" next the source line indicia displayed.

The display of FIG. 8 is a prelude to the more interesting information available from this alternative embodiment. In operation, the pointer or cursor 20 of the pointing device 250, reference being had to FIG. 7, is maneuvered adjacent one of the source line's indicia, in this case the source line identified by the indicia "demo.c 45" to select 306 that source line for closer scrutiny. The mouse clicker 26 is clicked, and the program of Appendix A will begin a selection process 308 which transfers 310 the selection to a source order display process 304 will arrange that selected source line with additional source lines that are proximally located before and after the selected source line "demo.c 45" in the order that the source lines are kept by the source lines file 256. The source order display process 304 accepts 311 source line to time use information from a table determined during the merge process 282, and accepts 312 source line text, indicia and other information from the source lines file 256, to prepare 314 and present to the display 16 a tabular display.

FIG. 9 is a screen display resulting from the source order display process 304. In FIG. 9, a screen 330 displays a first column 332 listing indicia identifying the selected source line "demo.c 45", and lists it in the order of the source lines file 256 with indicia identifying other source lines proximally located and kept by the source lines file 256. The second column 324 lists the time in seconds spent by the computer 13 in the test program run executing the machine instructions into which each of the listed was translated in the translation process 260. The third column 325 lists the time spent as a proportion of the total time spent in the tested program run 272. The fourth column 326 lists the times spent as a percentage of the total time spent in the run of the tested program. Of course, the time spent for the selected source line has a machine instruction which was not executed, and this fact is called to the attention of the user by the "*" marking that source line in the screen display 330 of FIG. 9.

The fifth column 327 sets forth the text or at least a portion of the text of the source line corresponding the identifying indicia in the first column 322. This display presents to the user an identification of those source lines where, during the test run 272 of the tested program, no machine instructions were run, and presents this source line in the fundamentally sequential context of that source line in the source lines file order.

The screen display is exited by maneuvering the pointer 20 to the exit location 329 on the screen display 320, and clicking with the clicker 26. The user then has available a presentation of the relevant source lines' correlated machine instructions in lower level language code format. This presentation is obtained by giving the command "perf -coverage -asm a.out" to commence the merge process 282. The merge process 282 transfers 311 information from the source lines to machine instructions mapping file 266, and from the machine instructions to time use mapping file 278 to the source order display process 302. The source order display process 302 accepts 312 information from the source lines file 256 and machine instruction information from the machine instructions file 264, as indicated by the line path 318, to prepare a presentation for display 16.

In FIG. 10, the screen display 340 displays the selected source line "demo.c 45" having all of the machine instructions into which the source line "demo.c 45" was translated by the translation process 260 displayed in tabular form for ready reference and analysis. In particular,, the first column 342 lists the selected source line identifying indicia, and immediately following this selected source line's indicia is listed indicia identifying all of the machine instructions into which that source line "demo.c 45" was translated. Further, indicia for other source lines located proximal to the selected source line are listed, with at least some of the machine instructions into which those proximal source lines were translated in the translation process 260.

In rows juxtaposed the corresponding machine instruction or source line indicia are columns giving various information about the corresponding instruction or line. In particular, the second column 344 lists the amount of time spent in seconds to execute the machine instructions. The third column 346 lists the amount of time spent, expressed as a proportion of the total amount of time spent during the test run 272. The fourth column 348 gives the amount of time spent as a percentage of the total amount of time spent by the computer 13 in the test run 272, for the corresponding instruction. Of course, at least one instruction for the selected source line will be zero, but the times for the immediately sequential instructions are also given, allowing the user to put the selected line and instructions in the context of their expected use in the program.

The fifth column 350 has two parts. A first part 352 of the fifth column 350 lists the actual machine instruction, shown here in hexadecimal form. The second part 354 of the fifth column 350 gives the identified machine instruction in assembly language, which is useable by many programmers.

As may be appreciated, a method and apparatus is provide that allows a programmer to analyze a testing program and discover whether or not the testing program in its normal run actually tests all of the machine instructions into which the tested program has been compiled. Any deficiencies can be identified, and displayed in a format that identifies the most serious skips, and then in a format that allows the programmer to observe the deficiencies in the context of the lowest level language and in the fundamentally sequential context of the instruction in the run of the program. Any further testing which might be considered useful in light of the noted deficiencies can be designed with a focus on those instructions considered most important.

The foregoing detailed description of my invention and of preferred embodiments as to products, compositions and processes, is illustrative of specific embodiments only. It is to be understood, however, that additional embodiments may be perceived by those skilled in the art. The embodiments described herein, together with those additional embodiments, are considered to be within the scope of the present invention.

```
#include "stdio.h"
#include <a.out.h>
#include <stab.h>
#include <sys/exec.h>
include <malloc.h> define OrderedDisplayLinesMax 15 struct monheader {
    unsigned lowadr;
    unsigned highadr;
    unsigned mcount_buckets;
} monheader;

struct coventry {
    unsigned addr;
    unsigned count;
} *covarray;

struct line {
    struct line *next;
    char *filename;
    int linenumber;
    unsigned startaddress;
    unsigned length;
    float timeuse;
    int used;
} *firstline, *lastline;

struct exec exec;
struct line *OrderedDisplayLines[OrderedDisplayLinesMax];

int buckets;
short *ticks;
unsigned *coverage;
float TotalTime;

int asmmode;
char **disassembly;
int covermode;

FILE *MachineInstructionsFile;
char *ExecName;

float range(unsigned low, unsigned length);
unsigned usedrange(unsigned low, unsigned high);
int legaladdress(unsigned addr);

main(int argc, char **argv)
{
    int timeuseorderindex;
    int switches;

if (!XInit(NULL)) {
        printf("Can't create windows\n");
        exit(1);
    }
    switches = 1;
    while (switches && argc > 1)
        if (strcmp(argv[1], "-asm") == 0) {
``` merge.c 2/9

```
            asmmode = 1;
            argv++;
            argc--;
        } else if (strcmp(argv[1], "-coverage") == 0) {
            covermode = 1;
            argv++;
            argc--;
        } else
            switches = 0;
    if (argc > 2) {
        printf("Usage: perf [-asm] <filename>\n");
        exit(1);
    } else if (argc == 1)
        ExecName = "a.out";
    else
        ExecName = argv[1];
    MergeProcess(ExecName);
    if (covermode)
        CoverageOrderingProcess();
    else
        TimeUseOrderingProcess();
    OrderingDisplayProcess();
    SelectionProcess();
} int covcomp(struct coventry *cov1, struct coventry *cov2)
{
    return (int)(cov1->addr - cov2->addr);
}

MergeProcess(char *ExecName)
{
    FILE *SourceLinestoMachineInstructionsMappingFile;
    FILE *bmonfile;
    char command[1000];
    struct nlist nl;
    int count;
    unsigned addr;
    int stringtablesize;
    char *stringtable;
    char *filename;
    struct line *line;
    int bmonsize;

/* Read in Source Lines to Machine Instructions Mapping File */
    if (!(SourceLinestoMachineInstructionsMappingFile = fopen("mon.out","r"))) {
        perror(ExecName);
        exit(1);
    }
    if (fread(&monheader, sizeof(monheader), 1,
            SourceLinestoMachineInstructionsMappingFile) != 1) {
        printf("mon.out file corrupted\n");
        exit(1);
    }
    if (fseek(SourceLinestoMachineInstructionsMappingFile,
            monheader.mcount_buckets*2*sizeof(int), 1)) {
        printf("mon.out file corrupted\n");
        exit(1);
    }
    buckets = (monheader.highadr - monheader.lowadr + 3)/4;
```

```
    /* Read in bmon.out */
    coverage = (unsigned *) calloc(buckets, sizeof(int));
    if ((bmonfile = fopen("bmon.out", "r")))
        if (i == 0 || fseek(bmonfile, 0, 2) == 0 ||
        else if (fseek(bmonfile)/sizeof(struct coventry)) < 1)
            printf("No Coverage Data Found\n");
        else {
            fseek(bmonfile, 0, 0);
            covarray = (struct coventry *) calloc(bmonsize, sizeof(struct coventry));
            if (fread(covarray, sizeof(struct coventry), bmonsize, bmonfile) !=
                bmonsize)
                printf("No Coverage Data Found\n");
            else {
                qsort(covarray, bmonsize, sizeof(struct covcomp));
                for (count = 0; count < bmonsize; count++)
                    if (legaladdress(covarray[count].addr) &&
                        (covarray[count+1].addr))
                    for (addr = covarray[count].addr; addr < covarray[count+1].addr; addr +=
                        coverage[(addr-monheader.lowaddr+3)/4] =
                        covarray[count].count; i = 0;
                }
    if (!(MachineInstructionsFile = fopen(ExecName, "r"))) {
        perror(ExecName);
        exit(1);
    }
    if (fread(&exec, sizeof(struct exec), 1, MachineInstructionsFile) != 1) {
        printf("Illegal Machine Instructions File: %s\n", ExecName);
        exit(1);
    }
    if (fseek(MachineInstructionsFile, N_STROFF(exec), 0)) {
        printf("Illegal Machine Instructions File: %s\n", ExecName);
        exit(1);
    }
    if (fread(&stringtablesize, sizeof(int), 1, MachineInstructionsFile) != 1) {
        printf("Illegal Machine Instructions File: %s\n", ExecName);
        exit(1);
    }
    stringtable = malloc(stringtablesize);
    if (fseek(MachineInstructionsFile, N_STROFF(exec), 0)) {
        printf("Illegal Machine Instructions File: %s\n", ExecName);
        exit(1);
    }
    if (fread(stringtable, 1, stringtablesize, MachineInstructionsFile) !=
        stringtablesize) {
        printf("Illegal Machine Instructions File: %s\n", ExecName);
        exit(1);
    }
    if (fseek(MachineInstructionsFile, N_SYMOFF(exec), 0)) {
        printf("Illegal Machine Instructions File: %s\n", ExecName);
        exit(1);
    }
``` merge.c 4/9

```
    if (asmmode)
        setupdisassembly();
    filename = "";
    for (count = 0; count < (exec.a_syms/sizeof(struct nlist)); count++) {
        fread(&nl, sizeof(struct nlist), 1, MachineInstructionsFile);
        if (nl.n_type == 0x64)
            filename = stringtable+nl.n_un.n_strx;
        else if (!nl.n_un.n_strx && nl.n_type == 0x44) {
            if (!lastline)
                firstline = line = (struct line *)malloc(sizeof(struct line));
            else {
                if (strcmp(lastline->filename, filename) == 0 &&
                        nl.n_desc <= lastline->linenumber)
                    continue;
                if (nl.n_value == lastline->startaddress)
                    line = lastline;
                else {
                    line = (struct line *)malloc(sizeof(struct line));
                    lastline->next = line;
                    lastline->length = nl.n_value - lastline->startaddress;
                    lastline->timeuse = range(lastline->startaddress,
                                        lastline->length);
                    lastline->used = usedrange(lastline->startaddress, 4);
                }
            }
            line->next = (struct line *)NULL;
            line->filename = filename;
            line->linenumber = nl.n_desc;
            line->startaddress = nl.n_value;
            line->length = 0;
            line->timeuse = 0;
            line->used = 0;
            lastline = line;
        }
    }
    if (lastline)
        lastline->used = 1;
    for (count = 0; count < buckets; count++)
        TotalTime += ((float)ticks[count])/100;
} legaladdress(unsigned addr)
{
    return monheader.lowadr <= addr && addr < monheader.highadr;
} float range(unsigned low, unsigned length)
{
    int offset;
    float ret = 0;

for (offset = 0; offset < length; offset += 4)
        if (legaladdress(low+offset))
            ret += ((float)ticks[(low+offset - monheader.lowadr + 3) / 4])/100;
    return ret;
} unsigned umin(unsigned x, unsigned y)
{
``` merge.c 5/9

```c
    if (x < y)
        return x;
    else
        return y;
} unsigned usedrange(unsigned low, unsigned length)
{
    int offset;
    int ret = 1;

for (offset = 0; offset < length; offset += 4)
        if (legaladdress(low+offset))
            ret = umin(ret, coverage[(low+offset - monheader.lowadr + 3) / 4]);
    return ret;
}

PrintLine(char ***dispptr, struct line *line, char *chars)
{
    **dispptr = malloc(200);
    if (!line)
        sprintf(*(*dispptr)++, " %10s %-4d                         %s", chars);
    else
        sprintf(*(*dispptr)++,
                "%c%10s %-4d %7.2f %6.5f %%%6.3f %s", line->used?' ':'*',
                line->filename,
                line->linenumber, line->timeuse, line->timeuse/TotalTime,
                line->timeuse*100/TotalTime, chars);
} setupdisassembly()
{
    char command[200];
    char chars[81];
    FILE *disfile;
    unsigned addr;

sprintf(command, "dis %s > /tmp/dis", ExecName);
    if (system(command) >> 8 == 0 && (disfile = fopen("/tmp/dis", "r"))) {
        disassembly = (char **)calloc(buckets, sizeof(char *));
        while (fgets(chars, 80, disfile))
            if (chars[0] == ' ' && chars[8] == ':') {
                if (chars[strlen(chars)-1] == '\n')
                    chars[strlen(chars)-1] = '\0';
                chars[8] = '\0';
                sscanf(chars, "%8x", &addr);
                if (legaladdress(addr)) {
                    disassembly[(addr-monheader.lowadr+3)/4] =
                            malloc(strlen(chars+11)+1);
                    strcpy(disassembly[(addr-monheader.lowadr+3)/4],
                            chars+11);
                }
            }
        fclose(disfile);
    }
}

/* Machine dependent machine code disassembler */
Disassemble(unsigned addr, char *chars)
{
``` merge.c 6/9

```
    unsigned instruction;
    char *dis = "";

if (legaladdress(addr))
        dis = disassembly[(addr-monheader.lowadr+3)/4];
    sprintf(chars, "        %s", dis);
}

PrintAsmLine(char ***dispptr, unsigned addr)
{
    unsigned machinecode;
    char chars[81];

Disassemble(addr, chars);
    **dispptr = malloc(200);
    sprintf(*(*dispptr)++,
            "%c0x%08x     %7.2f %6.5f %%%6.3f %s",
            usedrange(addr,4)?' ':'*',
            addr, range(addr,4), range(addr,4)/TotalTime,
            range(addr,4)*100/TotalTime, chars);
}

FILE *skiptoline(char *SourceLinesFile, int firstnumber)
{
    FILE *file;
    char chars[100];
    int count;

if (!(file = fopen(SourceLinesFile, "r"))) {
        perror(SourceLinesFile);
        return (FILE *)NULL;
    }
    for (count = 1; count < firstnumber; count++)
        if (feof(file))
            return (FILE *)NULL;
        else
            fgets(chars, 80, file);
    return file;
} getaline(FILE *file, char *chars)
{
    static char temp[81];
    char *p;
    int count = 0;

if (!file || feof(file) || !fgets(temp, 80, file))
        *temp = '\0';
    else if (*temp && chars[strlen(temp)-1] == '\n')
        temp[strlen(temp)-1] = '\0';
    p = temp;
    while (*p && count < 80)
        if (*p == '\t') {
            do {
                *chars++ = ' ';
                count++;
            } while (count & 7);
            p++;
        } else {
            *chars++ = *p++;
``` merge.c 7/9

```
            count++;
        }
    *chars++ = '\0';
}

SourceOrderDisplayProcess(char *SourceLinesFile, int LineNumber)
{
    int numberoflines;
    int count;
    int firstnumber;
    FILE *file;
    char chars[80];
    struct line *line;
    float timeuse;
    char *ptr;
    char **display;
    char **dispptr;
    unsigned offset;
    int Lines;
    int outputlines=0;

if (asmmode)
        Lines = 3;
    else
        Lines = 20;
    display = (char **)calloc(100, sizeof(char *));
    dispptr = display;
    PrintHeader(&dispptr, "Source Order", "");
    if ((firstnumber = LineNumber - Lines / 2) < 1)
        firstnumber = 1;
    file = skiptoline(SourceLinesFile, firstnumber);
    for (count = 0; count < Lines; count++) {
        getaline(file, chars);
        for (line = firstline; line; line=line->next)
            if (strcmp(SourceLinesFile, line->filename) == 0 &&
                    firstnumber+count == line->linenumber)
                break;
        if (!line) {
            if (!file || feof(file))
                break;
            *dispptr = malloc(200);
            sprintf(*dispptr++, " %10s %-4d                        %s",
                    SourceLinesFile, firstnumber+count, chars);
            outputlines++;
        } else {
            PrintLine(&dispptr, line, chars);
            outputlines++;
            if (asmmode)
                for (offset = 0; offset < line->length; offset+=4) {
                    PrintAsmLine(&dispptr, line->startaddress+offset);
                    outputlines++;
                }
        }
    }
    close(file);
    XMakeWindow(display, outputlines+4, NULL);
}

TimeUseOrderingProcess()
{
``` merge.c 8/9

```c
    struct line *line;
    int count;
    int i;

for (line = firstline; line; line = line->next)
        if (line->timeuse > 0)
            for (count = 0; count < OrderedDisplayLinesMax; count++)
                if (!OrderedDisplayLines[count] ||
                        line->timeuse > OrderedDisplayLines[count]->timeuse) {
                    for (i = OrderedDisplayLinesMax-1; i > count; i--)
                        OrderedDisplayLines[i] = OrderedDisplayLines[i-1];
                    OrderedDisplayLines[count] = line;
                    break;
                }
}
PrintHeader(char ***dispptr, char *header, char *exitstring)
{
    *(*dispptr)++ = header;
    *(*dispptr)++ = exitstring;
    *(*dispptr)++ = "   Filename Line Seconds Portion Percent Text\n";
    *(*dispptr)++ = " ---------- ---- ------- ------- ------- ------------------
} void SelectLine(int line)
{
    if (line == 1)
        exit(1);
    if (line < 4)
        return;
    SourceOrderDisplayProcess(OrderedDisplayLines[line-4]->filename,
                            OrderedDisplayLines[line-4]->linenumber);
}

OrderingDisplayProcess()
{
    int count;
    char **display = (char **)calloc(OrderedDisplayLinesMax+5, sizeof(char *));
    char **dispptr = display;
    FILE *file;
    char text[81];

if (covermode)
        PrintHeader(&dispptr, "Test Coverage", "Exit");
    else
        PrintHeader(&dispptr, "Time Use Order", "Exit");
    for (count = 0; count < OrderedDisplayLinesMax; count++)
        if (OrderedDisplayLines[count]) {
            file = skiptoline(OrderedDisplayLines[count]->filename,
                            OrderedDisplayLines[count]->linenumber);
            getaline(file, text);
            PrintLine(&dispptr, OrderedDisplayLines[count], text);
            fclose(file);
        } else
            break;
    XMakeWindow(display, count+4, SelectLine);
}

CoverageOrderingProcess()
{
```

```
struct line *line;
int count;

for (line = firstline; line; line = line->next)
    if (!line->used)
        for (count = 0; count < OrderedDisplayLinesMax; count++)
            if (!orderedDisplayLines[count]) {
                OrderedDisplayLines[count] = line;
                break;
            }

SelectionProcess()
}
XEventLoop();
}
``` wstuff.c 1/3

```c
include <stdio.h>
#include <X11/X.h>
#include <X11/Xlib.h>
#include <X11/Xutil.h>
#include <X11/Xatom.h>
include <X11/cursorfont.h> static Display *display;
static int screen;
static XFontStruct *font_info;
static int font_h, font_ascent;
static Atom xa_wm_protocols;
static Atom wm_del_window;
static Cursor arrow_cur;
unsigned long fg_pixel, bg_pixel;
static GC gc;

static struct win_inf {
    struct win_inf *next;
    Window wid;
    void (*func)();
    char **text;
    int cnt;
} *winds;

int DebugError() {
    exit(1);
} static int ghsXSetWMProtocols(display,wind,atomlist,len)
Display *display;
Window wind;
Atom *atomlist;
int len;
{
        return( XChangeProperty(display,wind,xa_wm_protocols,XA_ATOM,32,
                                PropModeReplace, (unsigned char *) atomlist,
                                len));
}

/* These are entry points to the real world:
        XInit(dispname)
        XMakeWindow(text,cnt,func)
        XEventLoop()
*/
int XInit(dispname) char *dispname; {
    unsigned long valuemask = 0;
    XGCValues values;

display = XOpenDisplay(dispname);
    if ( display==NULL ) {
        fprintf( stderr, "Cannot open display: %s\n", XDisplayName(dispname));
return 0;
    }
    screen = DefaultScreen(display);
    wm_del_window = XInternAtom(display,"WM_DELETE_WINDOW",False);
    xa_wm_protocols = XInternAtom(display,"WM_PROTOCOLS",False);
    arrow_cur = XCreateFontCursor(display, XC_left_ptr);
    fg_pixel = BlackPixel(display,screen);
    bg_pixel = WhitePixel(display,screen);
``` wstuff.c 213

```
        if ( (font_info = XLoadQueryFont(display,"courier-bold"))==NULL ) {
            if (( font_info = XLoadQueryFont(display,"*-courier-bold-r-normal--12-12
                if (( font_info = XLoadQueryFont(display,"fixed"))==NULL ) {
                    if (( font_info = XLoadQueryFont(display,"9x15"))==NULL ) {
                        fprintf( stderr, "Can't open font\n" );
return( 0 );
                    }
                }
            }
        }
        font_ascent = font_info->ascent;
        font_h = font_info->descent + font_ascent;
        gc = XCreateGC(display, RootWindow(display,screen), valuemask, &values);
        XSetForeground(display,gc,fg_pixel);
        XSetBackground(display,gc,bg_pixel);
        XSetFont(display, gc, font_info->fid);
return( 1 );
} void XMakeWindow(text,cnt,func) char **text; int cnt; void (*func)(); {
    int i, width, height, tmp;
    XSetWindowAttributes wattr;
    int mask = 0;
    Window wind;
    struct win_inf *temp;

for ( i=0, width=1; i<cnt; ++i ) {
        tmp = XTextWidth(font_info,text[i], strlen(text[i]));
        if ( tmp>width )
            width = tmp;
    }
    height = cnt*font_h;
    if ( height==0 ) height=font_h;

wattr.event_mask = PropertyChangeMask|StructureNotifyMask|ExposureMask;   mas
    if ( func!=NULL )
        wattr.event_mask |= ButtonPressMask|ButtonReleaseMask;
    wattr.cursor = arrow_cur;              mask |= CWCursor;
    wattr.border_pixel = fg_pixel;         mask |= CWBackPixel;
    wattr.background_pixel = bg_pixel;     mask |= CWBorderPixel;

wind = XCreateWindow(display, RootWindow(display,screen),
                    0, 0, width, height, 2, CopyFromParent,
                    InputOutput, CopyFromParent, mask, &wattr);
    ghsXSetWMProtocols(display,wind,&wm_del_window,1);
    XMapWindow(display,wind);

if (( temp = (struct win_inf *) calloc(1,sizeof( struct win_inf )))==NULL )
        fprintf( stderr, "Out of memory\n" );
        exit(1);
    }
    temp->wid = wind;
    temp->func = func;
    temp->text = text;
    temp->cnt = cnt;
    temp->next = winds;
    winds = temp;
}
``` wstuff.c 3/3

```c
void XEventLoop() {
    XEvent event;
    struct win_inf *item, *prev;
    int line, i;

while ( winds!=NULL ) {
        XNextEvent(display,&event);
        item = winds; prev = NULL;
        while ( item!=NULL && item->wid!=event.xany.window ) {
            prev = item;
            item = item->next;
        }
        if ( item==NULL )
   continue;
        switch ( event.type ) {
          case ButtonPress:
            line = event.xbutton.y/font_h;
          break;
          case ButtonRelease:
            if ( event.xbutton.y/font_h==line && item->func!=NULL )
                (item->func)(line);
          break;
          case ClientMessage:
            XDestroyWindow(display,item->wid);
          case DestroyNotify:
            if ( prev==NULL )
                winds = item->next;
            else
                prev->next = item->next;
            if ( item->func!=NULL || winds==NULL )
return;
          break;
          case Expose:
            for ( i=0; i<item->cnt; ++i )
                XDrawString(display,item->wid,gc,0,font_h*i+font_ascent,
                    item->text[i],strlen(item->text[i]));
          break;
        }
    }
}
```

*demo.c* 1/1

```c
include <stdio.h> int counter;

enum sex {female, male};

struct information {
    int age;
    enum sex sex;
};

struct list {
    struct list *next;
    char name[8];
    struct information information;
} *list;

struct element {
    char name[8];
    int age;
    enum sex sex;
} table[] = {
    "Steve",    47, male,
    "Mary",     28, female,
    "Pat",      49, female,
    "Ellen",    33, female,
    "Bob",      22, male,
    "Max",      59, male,
    "Marcus",   33, male,
    "Richard",  53, male,
    "Melanie",  44, female,
    "Diane",    22, female,
};

#define COUNT (sizeof(table) / sizeof(struct element))

demoC()
{
    int count;
    static int zero;

for (count = 0; count < COUNT; count++)
        add_to_list(table[count].name, table[count].age, table[count].sex);
    while (zero) {
        counter++;
        printf("count = %d\n", ++count);
    }
} main()
{
    int zero = 0;

demoC(0);
    demoPerformance();
} demoPerformance()
{
    int i;
```

O'Dowd et al.
APPENDIX B demo.c 1/2

```
    for (i = 0; i < 2000000; i++)
        increment_counter();
    fact(10);
    do_loop();
} static int a[4000];

do_loop()
{
    int i;

for (i = 0; i < 4000000; i++)
        a[i%1000] = 1;
} increment_counter()
{
    counter++;
} add_to_list(name, age, sex)
char *name;
enum sex sex;
{
    struct list *temp = (struct list *)calloc(1, sizeof(struct list));

memcpy(temp->name, name, 8);
    temp->information.age = age;
    temp->information.sex = sex;
    temp->next = list;
    list = temp;
} fact(n)
{
    if (n == 1)
        return 1;
    else
        return n*fact(n-1);
}
```

We claim:

1. In a testing procedure for testing a higher level language program having a plurality of code lines each kept in an order relative to each other, and each of said code lines translated into correlated machine instructions, a method for testing the testing procedure comprising the steps of:
   a. determining, for any of said code lines, if at least one of said correlated machine instructions was not executed in any run of said testing procedure;
   b. displaying indicia identifying at least one of said plurality of said code lines translated into machine instructions which were not executed in any run of said testing procedure;
   c. selecting said at least one of said code lines identified by indicia; and,
   d. displaying said selected code line indicia along with indicia identifying at least one additional code line proximal said selected code line in said kept order.

2. The method of claim 1 wherein in said displaying step, said indicia displayed includes text of at least some of said code line.

3. The method of claim 1 wherein in said displaying step, further displaying machine instruction indicia identifying said machine instructions for said at least one code line, which machine instructions were not executed in any run of said testing procedure.

4. The method of claim 1 further comprising the step of displaying machine instructions indicia identifying said machine instructions for said at least one additional code line having indicia displayed.

5. The method of claim 4 further comprising the step of configuring a second testing procedure during a run of which, machine instructions into which said selected code line has been translated will be executed.

6. The method of claim 1 further comprising the step of configuring a second testing procedure during a run of which, machine instructions into which said at least one code line has been translated will be executed.

7. The digital processing apparatus of claim 6 wherein said display means includes means for displaying machine instruction indicia identifying said machine code instructions for each said code line identified by displayed indicia.

8. A digital processing apparatus for testing a testing procedure for a higher level language program having a plurality of code lines kept in an order, each of said code lines being translated into a plurality of machine instructions, comprising:
   a. determining means for determining at least one of said code lines was not executed in any run of said testing procedure;
   b. display means connected to said determining means, for displaying indicia identifying at least one of said plurality of said code lines translated into a machine instruction which was not executed in any run of said testing procedure test program;
   c. selecting means for selecting said at least one of said code lines identified by indicia; and,
   d. wherein said display means further includes means for displaying said selected code line indicia along with indicia identifying at least one additional code lines proximal said selected code line in said kept order.

9. The digital processing apparatus of claim 8 wherein said display means includes means for displaying said indicia in the form of text of at least some of said code line.

10. The digital processing apparatus of claim 8 wherein said display means includes means for displaying machine instruction indicia identifying said machine instructions for said at least one code line which said machine instructions were not executed in any run of said testing procedure.

11. A method for performing time efficiency analysis of at least one routine of a program represented in a high level source code language and compiled to a lower level language in which each of many source code lines correspond to a plurality of lower level language code lines, comprising the steps of:
   a. determining the time of use of each source code line used in said routine during at least one run of said routine; and,
   b. displaying source code line identification for at least some of said source code lines of said routine and further displaying juxtaposed thereto respectively corresponding representations of the time of use of each of said identified source code lines during said routine.

12. The method of claim 11 wherein in said displaying step, the displayed source code line identifications are arranged in order of the corresponding run times of the corresponding source code lines.

13. The method of claim 12 which further includes the steps of:
   a. selecting one of said source code line identifications; and,
   b. displaying in normal program order representations of the selected source code line and immediately program adjacent source code lines.

14. The method of claim 13 wherein said step of displaying normal program order representations further includes the step of displaying a marker for the representation of the selected source code line.

15. The method of claim 13 wherein said step of displaying normal program order representations further includes the step of displaying juxtaposed to each displayed source code line representation a representation of its corresponding run time.

16. The method of claim 11 wherein said determining step further includes the step of determining the time of use of each identified source code line as a percentage of the run time of said routine.

17. The method of claim 11 wherein said determining step includes the steps of:
   a. determining for each source code line the corresponding lower level language instructions used in said routine;
   b. determining the time of use of each lower level language instructions used in said routine; and,
   c. merging the data from each of said determining steps to determine the time of use of each source code line used in said routine during at least a portion of said one run of said routine.

18. The method of claim 11 which further includes the steps of:
   a. determining for at least a selected one of said source code lines the time of use of each code line of the corresponding plurality of lower level language code lines; and,
   b. displaying, in a single display, source code line identifying indicia for the selected source code line and lower level language code identifying indicia for each of the corresponding lower level language code lines, together with corresponding time of use indicia for each of the displayed lower level language code lines.

19. The method of claim 18 wherein in said displaying step the time of use indicia represent the percentage time of use of each of said displayed source code lines relative to the execute time of said routine.

20. The method of claim 18 wherein in said displaying step the corresponding time of use indicia represent the percentage time of use of each of the displayed lower level language code lines relative to the total run time of the plurality of lower level language code lines.

21. The method of claim 18 wherein the lower level language is assembly code language and the lower level language code lines are assembly code lines.

22. The method of claim 18 wherein the higher level language is selected from the group consisting of C, C++, Fortran, Pascal and Ada.

23. The method of claim 18 wherein said displaying step said source code line identifying indicia each includes at least a portion of the text of the corresponding source code line.

24. The method of claim 18 wherein in said displaying step the lower level language code line identifying indicia each includes at least a portion of the text of the corresponding lower level language code line.

25. A digital processing apparatus for a performing time efficiency analysis of at least one routine of a program represented in a higher level source code language and compiled to a lower level language in which each of many source code lines correspond to a plurality of lower-level language code lines, comprising:

a. means for determining for each source code line used in said routine the time of use of said plurality of lower level language code lines into which said source code line has been compiled during at least one run of said routine; and, b. display means connect to said determining means for displaying source code line identification for at least some of said source code lines of said routine and further for displaying juxtaposed thereto respectively corresponding representations of said determined time of use for each of said identified source code lines.

26. A method for performing time usage analysis of at least a portion of a higher level language program having a plurality of source lines kept in an order, each of said source lines being translated to machine instructions operative to run a digital processing apparatus during a corresponding run time of said machine instructions, comprising the step of:

determining for each of at least a number of said source lines an amount of source line run time spent by the corresponding machine instructions to run said digital processing apparatus for said at least a portion of said higher level language program.

27. The method of claim 26 further comprising the steps of:

a. summing the source line run times spent for said at least portion of said higher level language program to determine a total sum of times for said source line run times; and, b. determining for each of said number of source lines what proportion said determined amount of source line run time is, as a percentage, of said total sum of times determined for said at least a portion of said program.

28. The method of claim 27 further comprising the step of displaying source line indicia identifying at least a portion of said source lines, said indicia for each said source line being juxtaposed with a display of a corresponding percentage determined for said source line.

29. The method of claim 26 further comprising the steps of:

a. determining a total sum of source line run times spent for said at least portion of said higher level language program; and, b. determining for each of said number of source lines what proportion said determined amount of source line run time spent for each source line is, as a relative portion, of said total sum of source line run times for said at least a portion of said program.

30. The method of claim 26 further including the step of selectively replacing machine instructions in said program with different machine instructions selected according to source line run times of source lines corresponding to said different machine instructions.

31. The method of claim 30 wherein said replacing step further includes the step of translating a source line into different machine instructions.

32. The method of claim 26 further comprising the steps of displaying source line indicia identifying said source lines; and displaying, juxtaposed each of said displayed source line indicia, second indicia representing said source line run time corresponding to said source line indicia.

33. The method of claim 32 wherein in said displaying steps, each source line indicia comprises at least a portion of the corresponding source line.

34. The method of claim 32 wherein in said displaying steps, each source line indicia comprises at least a portion of the machine instructions into which said source line has been translated.

35. The method of claim 32 wherein in said displaying steps, each source line indicia is displayed in said kept order.

36. The method of claim 35 wherein in said displaying steps, each source line indicia comprises at least a portion of the machine instructions into which said source line has been translated.

37. The method of claim 32 wherein in said displaying steps, said second indicia representing said determined source line run times comprises absolute time units.

38. The method of claim 32 further comprising the steps of:

a. summing the source line run times spent for said at least portion of said higher level language to determine a total sum of said source line run times;

b. determining for each of said number of source lines what proportion said determined amount of source line run time spent is, as a percentage, of said total sum of times determined for said at least a portion of said program; and, c. displaying in said display step, said percentage juxtaposed its corresponding source line indicia.

39. The method of claim 32 further comprising the steps of:

a. summing the source line run times spent for said at least portion of said higher level language to determine a total sum of said source line run times;

b. determining for each of said number of source lines what proportion said determined amount of source line run time spent is, as a relative proportion, of said total sum time determined for said at least a portion of said program; and, c. displaying in said display step said proportion juxtaposed its corresponding source line indicia.

40. The method of claim 32 wherein in said displaying steps, the second indicia representing said source line run times comprises a graphical display having indicia selected from a group consisting of bar graphs, pie charts, line graphs and any combination thereof.

41. The method of claim 32 further comprising the step of interacting with said display to change said display.

42. The method of claim 26 further comprising the step of arranging said source lines in an order relative to said determined source line run times spent.

43. The method of claim 42 further comprising the steps of:
   a. selecting one of said source lines; and,
   b. displaying selected source line indicia identifying said selected one of said source lines.

44. The method of claim 43 wherein said displaying step, displaying said selected source indicia along with indicia identifying at least a number of additional source lines proximal said selected one of said source lines in said kept order.

45. The method of claim 43 wherein in said displaying step, displaying as at least part of the source line indicia displayed at least a portion of the corresponding source line.

46. The method of claim 43 wherein in said displaying step, displaying as at least a part of each source line indicia at least a portion of the machine instructions into which said source line has been translated.

47. The method of claim 43 further comprising the step of interacting with said display to change said display.

48. The method of claim 42 further comprising the steps of displaying source line indicia for at least a of said source lines in said kept order.

49. The method of claim 48 further comprising the steps of:
   a. selecting one of said displayed source line indicia; and,
   b. displaying said selected one of said source line indicia.

50. The method of claim 49 further comprising the step of displaying additional source line indicia identifying source lines proximal in said kept order to the selected source line.

51. The method of claim 49 wherein in said displaying step, displaying as at least a part of each source line indicia at least a portion of the corresponding source lines.

52. The method of claim 49 wherein in said displaying step, displaying at least part of each source line indicia at least a portion of the machine instructions into which said source line has been translated.

53. The method of claim 49 further comprising the step of interacting with said display to change said display.

54. The method of claim 48 wherein said displaying step further comprises the step of displaying juxtaposed each of said source line indicia, second indicia representing said determined source line run time.

55. The method of claim 54 wherein said indicia representing said determined source line run time comprises absolute time units.

56. The method of claim 54 wherein said indicia representing said determined source line run time comprises said determined proportions in percentages.

57. The method of claim 54 wherein in said displaying steps, the indicia representing said determined source line run time comprises a graphical display having indicia selected from a group consisting of bar graphs, pie charts, line graphs and any combination thereof.

58. A digital processing apparatus for performing a time use analysis of a higher level language program having a plurality of source lines kept in an order, each of said source lines being translated to corresponding machine instructions operative to run said digital processing apparatus during a corresponding run time of said machine instructions, comprising:
   source line run time determining means for determining for each of a number of said source lines an amount of source line run time spent by the corresponding machine instructions to run said digital processing apparatus for said at least portion of said higher level language program.

59. The digital processing apparatus of claim 58 further comprising:
   a. source line run times summing means for summing the source line run times spent for said at least portion of said higher level language program to determine a total sum of times for said source line run times; and,
   b. proportion determining means connected to said source line run time determining means and to said source line run times summing means, for determining for each of said number of source lines what proportion said determined source line run time spent is, as a percentage, of said total sum of times for said at least a portion of said program.

60. The digital processing apparatus of claim 59 further comprising display means connected to said proportion determining means, for displaying source line indicia identifying at least a of said source lines, and for displaying second indicia representing the determined proportion, as a percentage, corresponding to each said source line, said second indicia being displayed juxtaposed its corresponding source line indicia.

61. The digital processing apparatus of claim 58 further comprising:
   a. source line run times summing means for summing the source line run times spent for said at least portion of said higher level language program to determine a total sum of times for said source line run times; and,
   b. proportion determining means connected to said source line run time determining means and to said source line run times summing means, for determining for each of said number of source lines what proportion said determined source line run time spent is of said total sum of times for said at least a portion of said program.

62. The digital processing apparatus of claim 58 further comprising replacement means connected to and responsive to said source line run time determining means, for selectively replacing machine instructions in said program with different machine instructions selected according to source line run times of source lines corresponding to said replaced machine instructions.

63. The digital processing apparatus of claim 62 wherein said replacement means includes means for translating at least one selected source line into different machine instructions different from said replaced machine instructions.

64. The digital processing apparatus of claim 58 further comprising:
   displaying means connected to said source line run time determining means, for displaying source line indicia identifying each of at least a of said source lines, and for displaying, juxtaposed each of said displayed source line indicia, indicia representing said determine source line run time spent for the corresponding source line.

65. The digital processing apparatus of claim 64 wherein in said displaying means, said source line indicia includes at least a portion of the corresponding source line.

66. The digital processing apparatus of claim 64 wherein in said displaying means, said source line indicia includes at least a portion of the machine instructions into which said source line has been translated.

67. The digital processing apparatus of claim 64 wherein said displaying means comprises means for displaying each source line indicia displayed in said kept order.

68. The digital processing apparatus of claim 67 further comprising means for displaying, juxtaposed each said source line indicia displayed, at least a portion of the machine instructions into which the source line correlating to the source line indicia was translated.

69. The digital processing apparatus of claim 64 wherein said displaying means comprises means for displaying indicia representing said determined source line run times in absolute time units.

70. The digital processing apparatus of claim 64 further comprising:
 a. total sum time determining means for determining a total sum of the source line run times spent for said at least portion of said higher level language program;
 b. proportion determining means connected to said source line run time determining means and to said total sum time determining means, for determining what proportion of said determined source line run time spent is, as a percentage, of said total sum of times determined for said at least a portion of said program; and,
 c. wherein said display means includes means for displaying said percentage juxtaposed its corresponding source line indicia.

71. The digital processing apparatus of claim 64 further comprising:
 a. total sum time determining means for determining a total sum of the source line run times spent for said at least portion of said higher level language program;
 b. proportion determining means connected to said source line run time determining means and to said total sum time determining means, for determining what proportion of said determined source line run time spent is, as a percentage, of said total sum of times determined for said at least a portion of said program; and,
 c. wherein said display means includes means for displaying said percentage juxtaposed its corresponding source line indicia.

72. The digital processing apparatus of claim 64 wherein said displaying means comprises means for displaying indicia representing said determined source line run time in a graphical display having indicia selected from a group consisting of bar graphs, pie charts, line graphs and any combination thereof.

73. The digital processing apparatus of claim 64 further comprising means connected to said display means and responsive to human input, for interacting with said display for changing said display responsive to said human input.

74. The digital processing apparatus of claim 58 further comprising arranging means connected to said source line run time determining means, for arranging said source lines in an order relative to said determined source line run times.

75. The digital processing apparatus of claim 74 further comprising:
 a. selecting means connected to said arranging means for selecting one of said source lines; and,
 b. display means connected to, and responsive to said selecting means, for displaying selected source line indicia identifying said selected one of said source lines.

76. The digital processing means of claim 75 wherein said display means includes means connected to said source line run time determining means, for displaying said selected source line indicia along with indicia identifying at least a plurality of additional source lines proximal, in said kept order, said selected one of said source lines.

77. The digital processing apparatus of claim 75 wherein said display means includes means for displaying at least a portion of the corresponding source line.

78. The digital processing apparatus of claim 75 wherein said displaying means further comprises means for displaying each said source line indicia in a form of at least a portion of the machine instructions into which said source line was translated.

79. The digital processing apparatus of claim 75 further comprising means connected to said display means and responsive to human input, for interacting with said display for changing said display responsive to said human input.

80. The digital processing apparatus of claim 74 further comprising display means connected to and responsive to said arranging means, for displaying source line indicia identifying at least a number of said source lines in said arranged order.

81. The digital processing apparatus of claim 80 further comprising:
 a. selecting means connected to said display means for selecting one of said source line indicia; and,
 b. wherein said display means includes means responsive to said selecting means, for displaying selected source line indicia identifying said selected one of said source lines.

82. The digital processing apparatus of claim 81 wherein said display means includes means connected to said source line run time determining means, for displaying said selected source line indicia along with indicia identifying at least a number of additional source lines proximal, in said kept order, said selected one of said source lines.

83. The digital processing apparatus of claim 81 wherein said displaying means further comprises means for displaying in said display of source line indicia at least a portion of the source line corresponding to said source line indicia.

84. The digital processing apparatus of claim 81 wherein said displaying means further comprising means for displaying in said display of source line indicia at least a portion of the machine instructions into which said source line represented by said source line indicia was translated.

85. The digital processing apparatus of claim 81 further comprising means connected to said display means and responsive to human input, for interacting with said display for changing said display responsive to said human input.

86. The digital processing apparatus of claim 80 wherein said display means comprises means for displaying juxtaposed each of said source code line indicia, indicia representing said determined source line run time spent.

87. The digital processing apparatus of claim 86 wherein said display means comprises means for displaying said determined source line run time spent in absolute time units.

88. The digital processing apparatus of claim 86 wherein said display means comprises means for displaying said determined proportion in a percentage.

89. The digital processing apparatus of claim 86 wherein said displaying means comprises means for displaying said indicia representing said determined source line run time in a graphical display having indicia selected from a group consisting of bar graphs, pie charts, line graphs and any combination thereof.

* * * * *